(12) United States Patent
Kato et al.

(10) Patent No.: US 10,168,523 B2
(45) Date of Patent: Jan. 1, 2019

(54) IMAGE GENERATING SYSTEM, IMAGE GENERATING METHOD, AND IMAGE GENERATING APPARATUS

(71) Applicant: Panasonic Intellectual Property Management Co., Ltd., Osaka (JP)

(72) Inventors: Yumiko Kato, Osaka (JP); Yoshihide Sawada, Kyoto (JP); Masahiro Iwasaki, Nara (JP); Yasuhiro Mukaigawa, Nara (JP); Hiroyuki Kubo, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 225 days.

(21) Appl. No.: 15/388,159

(22) Filed: Dec. 22, 2016

(65) Prior Publication Data

US 2017/0192219 A1  Jul. 6, 2017

(30) Foreign Application Priority Data

Jan. 6, 2016  (JP) .................................. 2016-001390

(51) Int. Cl.
*G02B 21/18* (2006.01)
*H04N 5/225* (2006.01)
(Continued)

(52) U.S. Cl.
CPC ........... *G02B 21/18* (2013.01); *G02B 21/086* (2013.01); *G02B 21/361* (2013.01);
(Continued)

(58) Field of Classification Search
None
See application file for complete search history.

(56) References Cited

U.S. PATENT DOCUMENTS

2010/0092040 A1* 4/2010 Fischer .................. G01B 11/25
  382/106
2012/0223217 A1* 9/2012 Zheng ..................... B01L 3/508
  250/215

(Continued)

FOREIGN PATENT DOCUMENTS

JP  2013-101512  5/2013

*Primary Examiner* — Christopher G Findley
(74) *Attorney, Agent, or Firm* — Wenderoth, Lind & Ponack L.L.P.

(57) ABSTRACT

An image generating system that generates a focal image of a target object on a virtual focal plane located between a plurality of illuminators and an image sensor (b) carries out the following (c) through (f) for each of a plurality of pixels constituting the focal image, (c) carries out the following (d) through (f) for each of the positions of the plurality of illuminators, (d) calculates a position of a target point that is a point of intersection of a straight line connecting a position of the pixel on the focal plane and a position of the illuminator and a light receiving surface of the image sensor, (e) calculates a luminance value of the target point in the captured image by the illuminator on the basis of the position of the target point, (f) applies the luminance value of the target point to the luminance value of the pixel, and (g) generates the focal image of the target object on the focal plane by using a result of applying the luminance value at each of the plurality of pixels.

11 Claims, 29 Drawing Sheets

(51) Int. Cl.
*H04N 5/232* (2006.01)
*H04N 5/235* (2006.01)
*G02B 21/08* (2006.01)
*G02B 21/36* (2006.01)

(52) U.S. Cl.
CPC ......... *G02B 21/367* (2013.01); *H04N 5/2256* (2013.01); *H04N 5/2354* (2013.01); *H04N 5/23229* (2013.01)

(56) References Cited

U.S. PATENT DOCUMENTS

| | | | |
|---|---|---|---|
| 2012/0248292 A1* | 10/2012 | Ozcan | G02B 21/00 250/208.1 |
| 2013/0280752 A1* | 10/2013 | Ozcan | G01N 21/4795 435/29 |
| 2014/0133702 A1 | 5/2014 | Zheng et al. | |
| 2015/0035828 A1* | 2/2015 | Fradet | G06T 15/10 345/421 |
| 2016/0330389 A1* | 11/2016 | Adachi | H04N 5/357 |
| 2017/0168285 A1* | 6/2017 | Ozcan | G02B 21/367 |

\* cited by examiner

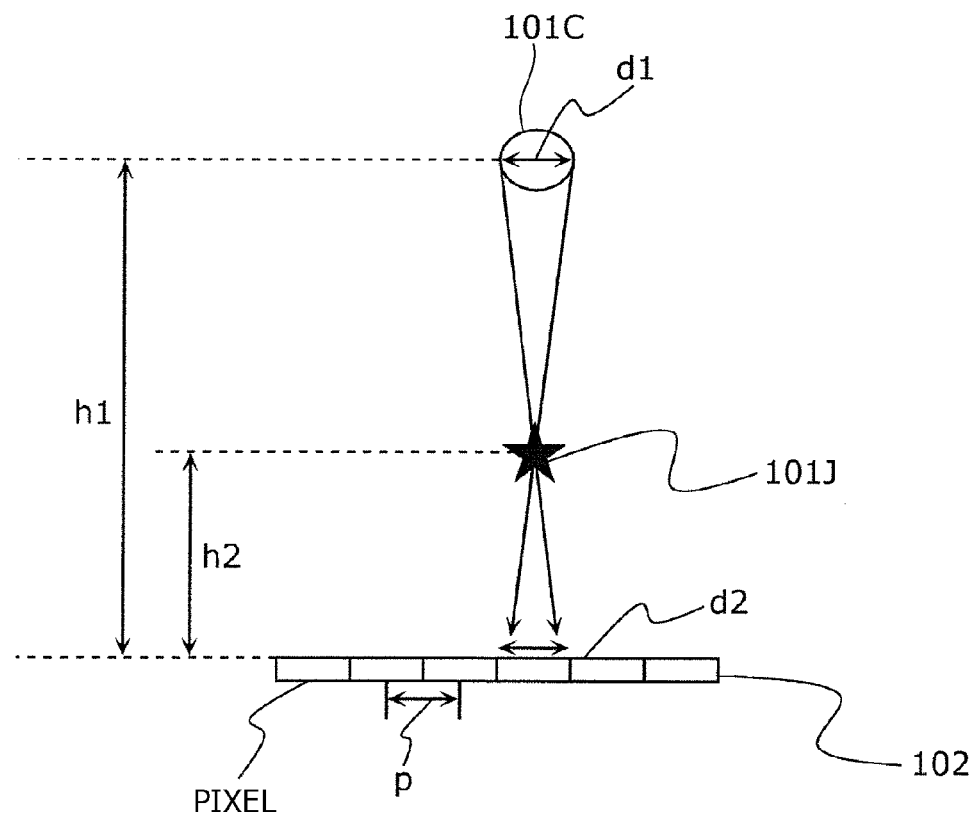

| CULTURE TIME | EMBRYO STATE | NUMBER OF FOCAL PLANES |
|---|---|---|
| 0 h TO 10 h | PRONUCLEAR STAGE | 1 |
| 10 h TO 24 h | TWO-CELL STAGE | 1 |
| 24 h TO 48 h | FOUR-CELL STAGE | 2 |
| 48 h TO 72 h | EIGHT-CELL STAGE | 3 |

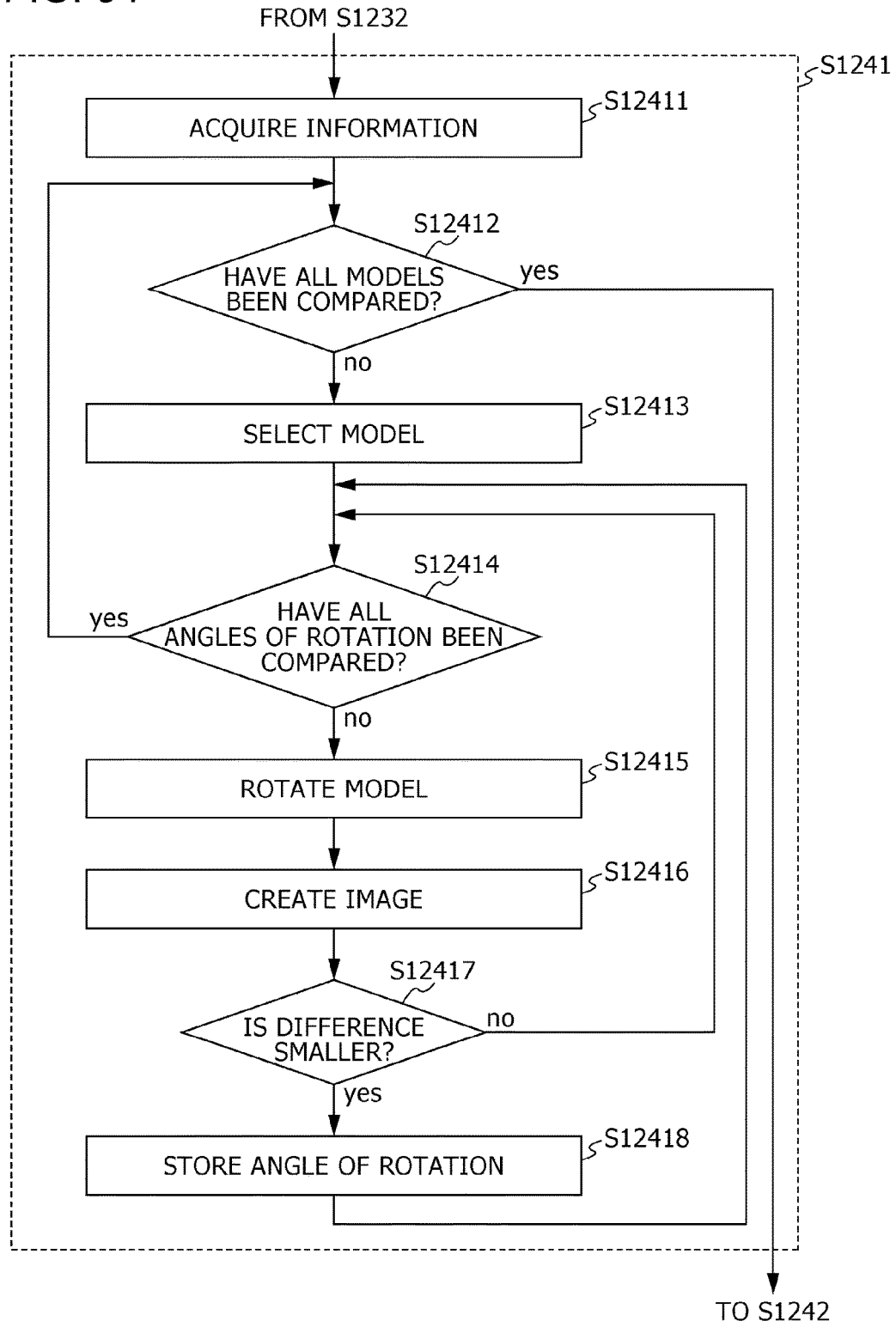

IMAGE GENERATING SYSTEM, IMAGE GENERATING METHOD, AND IMAGE GENERATING APPARATUS

BACKGROUND

1. Technical Field

The present disclosure relates to a technique for generating an image of a target object on a virtual focal plane on the basis of a plurality of images captured with a plurality of light sources in a lensless microscope.

2. Description of the Related Art

The demand that a cultured cell be observed continuously without staining the cell is present in many fields in which a cultured cell is used for a medical purpose or an industrial purpose, such as cell production for treatment or drug efficacy study. However, cells are largely colorless and transparent, and thus the three-dimensional structure of a cultured cell is hard to observe from an image captured with an optical microscope that uses transmitted light.

In order to evaluate a sectional shape of a cell, Japanese Unexamined Patent Application Publication No. 2013-101512 discloses a method of generating a focal image (pseudo-sectional image) of a plane that is not parallel to an objective lens from a number of images of a target object that are focused at different heights on the target object along a plane parallel to the objective lens (i.e., a number of images captured while moving the focus in the height-wise direction of the target object).

Continuous observation of a cultured cell is carried out within a restricted space as in an incubator for maintaining a high-humidity environment for culturing a cell. In order to carry out observation in such a high-humidity and restricted space, U.S. Patent Application Publication No. 2014/0133702 discloses a lensless microscope that makes it possible to observe a tiny cell without using a lens. A method of increasing the resolution by superimposing a plurality of images captured by illuminating a target object from a plurality of different positions (Ptychography) is disclosed.

However, according to the method disclosed in Japanese Unexamined Patent Application Publication No. 2013-101512, fragmentary images are cut out from the captured images focused at different height positions, and the cut-out fragmentary images are connected together. Thus, discontinuity appears at a portion where the fragmentary images are connected. As a result, the image quality of the pseudo-sectional image deteriorates due to the discontinuity. In addition, if blurring processing is carried out on the discontinuous portion in order to reduce the deterioration in the image quality associated with the discontinuity, the sharpness of the pseudo-sectional image decreases.

SUMMARY

One non-limiting and exemplary embodiment provides an image generating system that can generate a high-quality focal image of a target object on a virtual focal plane by using a plurality of captured images.

In one general aspect, the techniques disclosed here feature an image generating system that includes a plurality of illuminators, an image sensor on which a target object is to be placed, and at least one control circuit, wherein the image generating system generates a focal image of the target object on a virtual focal plane located between the plurality of illuminators and the image sensor, wherein the plurality of illuminators sequentially illuminate the target object, wherein the image sensor acquires a captured image of the target object each time the plurality of illuminators illuminate the target object, and wherein the at least one control circuit (a) acquires information on the focal plane located between the plurality of illuminators and the image sensor, (b) carries out the following (c) through (f) for each of a plurality of pixels constituting the focal image, (c) carries out the following (d) through (f) for each of positions of the plurality of illuminators, (d) calculates a position of a target point, the target point being a point of intersection of a straight line connecting a position of the pixel on the focal plane and a position of the illuminator and a light receiving surface of the image sensor, (e) calculates a luminance value of the target point in the captured image acquired while the target object is illuminated from the position of the illuminator on the basis of the position of the target point on the light receiving surface of the image sensor, (f) applies the luminance value of the target point to a luminance value of the pixel, (g) generates the focal image of the target object on the focal plane by using a result of applying the luminance value at each of the plurality of pixels, and (h) outputs the generated focal image of the target object.

According to the present disclosure, a high-quality focal image of a target object on a virtual focal plane can be generated with the use of a plurality of captured images.

It is to be noted that general or specific embodiments of the above may be implemented in the form of an apparatus, a method, an integrated circuit, a computer program, or a computer-readable recording medium, or may be implemented through any desired combination of an apparatus, a system, a method, an integrated circuit, a computer program, and a recording medium. A computer-readable recording medium includes, for example, a nonvolatile recording medium, such as a compact disc-read only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a schematic diagram for describing the size condition that should be satisfied by a pinhole included in an illuminator according to the first embodiment;

FIG. 6 illustrates an example of the content stored in a storage unit according to the first embodiment;

FIG. 34 is a flowchart illustrating processing pertaining to the determination of the cell arrangement by the focal plane determining unit according to the modification of the third embodiment;

DETAILED DESCRIPTION

Figure 1:
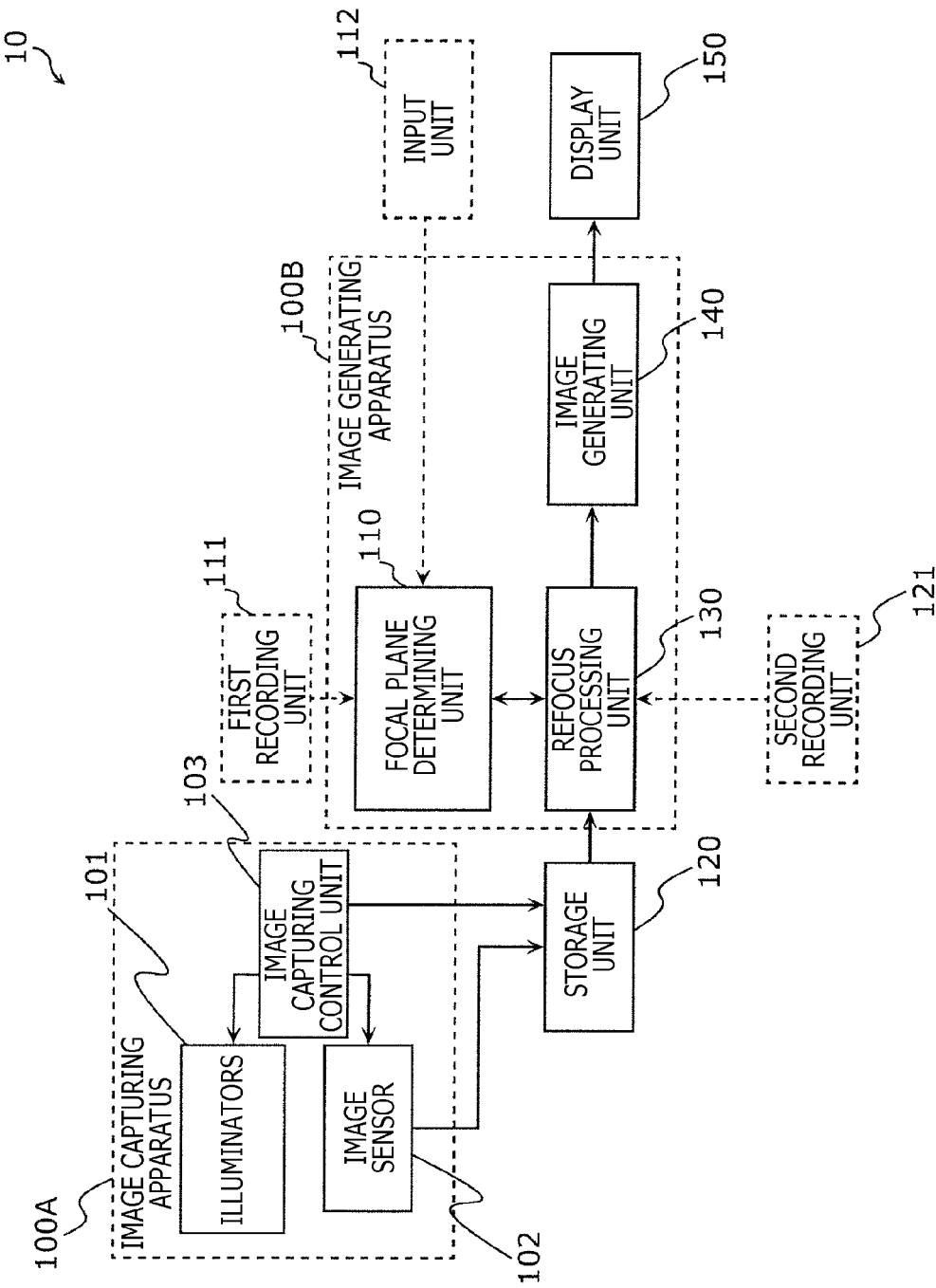
FIG. 1 is a block diagram illustrating an example of a functional configuration of an image generating system according to a first embodiment.

A focal image generating system according to an aspect of the present disclosure includes a plurality of illuminators, an image sensor on which a target object is to be placed, and at least one control circuit, wherein the image generating system generates a focal image of the target object on a virtual focal plane located between the plurality of illuminators and the image sensor, wherein the plurality of illuminators sequentially illuminate the target object, wherein the image sensor acquires a captured image of the target object each time the plurality of illuminators illuminate the target object, and wherein the at least one control circuit (a) acquires information on the focal plane located between the plurality of illuminators and the image sensor, (b) carries out the following (c) through (f) for each of a plurality of pixels constituting the focal image, (c) carries out the following (d) through (f) for each of positions of the plurality of illuminators, (d) calculates a position of a target point, the target point being a point of intersection of a straight line connecting a position of the pixel on the focal plane and a position of the illuminator and a light receiving surface of the image sensor, (e) calculates a luminance value of the target point in the captured image acquired while the target object is illuminated from the position of the illuminator on the basis of the position of the target point on the light receiving surface of the image sensor, (f) applies the luminance value of the target point to a luminance value of the pixel, (g) generates the focal image of the target object on the focal plane by using a result of applying the luminance value at each of the plurality of pixels, and (h) outputs the generated focal image of the target object.

According to this aspect, the luminance value of the target point, which is the point of intersection of the straight line connecting the position of the pixel on the focal plane and the position of the illuminator and the light receiving surface of the image sensor, can be applied to the luminance value of the pixel. Accordingly, the luminance values of a plurality of captured images that correspond to the pixel can be reflected on the pixel of the focal image on the virtual focal plane, and a high-quality focal image of the target object can be generated.

A focal image generating system according to an aspect of the present disclosure includes a plurality of illuminators, an image sensor on which a target object is to be placed, and at least one control circuit, wherein the image generating system generates a focal image of the target object on a virtual focal plane located between the plurality of illuminators and the image sensor, wherein the plurality of illuminators sequentially illuminate the target object, wherein the image sensor acquires a captured image of the target object each time the plurality of illuminators illuminate the target object, and wherein the at least one control circuit (a) acquires information on the focal plane located between the plurality of illuminators and the image sensor, (b) carries out the following (c) through (f) for each of the plurality of captured images, (c) acquires positional information of an illuminator that corresponds to the captured image, (d) carries out the following (e) and (f) for each of a plurality of first pixels included in the captured image, (e) calculates a position of a point of intersection of a straight line connecting a position of the first pixel on a light receiving surface of the image sensor and a position of the illuminator and the focal plane, (f) applies a luminance value of the first pixel to a luminance value of one or more second pixels, included in a plurality of second pixels constituting the focal image, that correspond to the position of the point of intersection on the focal plane, (g) generates the focal image of the target object on the focal plane by using a result of applying the luminance values of the plurality of second pixels, and (h) outputs the generated focal image of the target object.

According to this aspect, the luminance value of the first pixel in the captured image can be applied to the luminance value of the one or more second pixels in the focal image that correspond to the position of the point of intersection of the straight line connecting the position of the first pixel on the light receiving surface of the image sensor and the position of the illuminator and the focal plane. Accordingly, the luminance value of each pixel in the captured image can be reflected on the luminance value of a pixel in the focal image, and a high-quality focal image of the target object can be generated.

For example, each of the plurality of illuminators may include a light source and a shading plate that is located between the light source and the target object and that has a pinhole, and the light source may irradiate the target object with diffused light through the pinhole.

According to this aspect, the light source can irradiate the target object with diffused light through the pinhole. Accordingly, it becomes possible to prevent a plurality of light rays representing the light emitted by the illuminators from intersecting with each other. Thus, the image quality of the captured image of the target object can be improved, and the image quality of the focal image can also be improved.

For example, the image generating system may further include a display, and the display may display the focal image output from the at least one control circuit.

According to this aspect, the focal image can be displayed.

Furthermore, for example, a range for an illumination position may be determined on the basis of the information on the focal plane, and an illuminator, among the plurality of illuminators, that corresponds to the range for the illumination position may sequentially illuminate the target object.

According to this aspect, the range for the illumination position can be determined on the basis of the information on the focal plane, and the target object can be illuminated sequentially by the illuminator that corresponds to the determined range for the illumination position. Accordingly, it becomes possible to capture an image of the target object by using an illuminator suitable for generating a focal image on the focal plane, and the image capturing time can be reduced.

An image generating apparatus according to one aspect of the present disclosure includes illuminators that each emit light toward a target object, the illuminators including a first illuminator and a second illuminator, periods of the light emissions from the illuminators being not overlapped; an image sensor that includes pixels and obtains images of the target object during each of periods of the light emissions and outputs the images, the images including a first image and a second image, the first image being obtained during the light emission by the first illuminator and including first pixel values provided by the pixels, the second image being obtained during the light emission by the second illuminator and including second pixel values provided by the pixels, the target object being provided on the image sensor; a generator that generates a third image on a virtual plane between the illuminators and the image sensor, the third image including third pixel values; and an output that outputs the third image, wherein the third pixel values include a third pixel value at a third location on the virtual plane, wherein the generator calculates the third pixel value using first pixel value and second pixel value, wherein the first pixel values includes the first pixel value, the second pixel values includes the second pixel value, the first pixel value is provided by a first pixel included in the pixels, and the second pixel value is provided by a second pixel included in the pixel, wherein the first pixel is a closest pixel, among the pixels, to a first point being an intersection of a first line including the third location and a location of the first illuminator, and a light receiving surface of the image sensor, wherein the second pixel is a closest pixel, among the pixels, to a second point being an intersection of a second line including the third location and a location of the second illuminator, and a light receiving surface of the image sensor, and wherein no focus lens is provided between the illuminators and the image sensor.

For example, the light may be parallel light.

It is to be noted that general or specific embodiments of the above may be implemented in the form of an apparatus, a method, an integrated circuit, a computer program, or a computer-readable recording medium, such as a CD-ROM, or may be implemented through any desired combination of an apparatus, a method, an integrated circuit, a computer program, and a recording medium.

Hereinafter, a focal image generating system according to an aspect of the present disclosure will be described with concrete terms with reference to the drawings.

It is to be noted that the embodiments described hereinafter merely illustrate general or specific examples. The numerical values, the shapes, the constituent elements, the arrangement and the positions of the constituent elements, the connection modes of the constituent elements, the steps, the order of the steps, and so forth indicated in the following embodiments are examples and are not intended to limit the scope of the claims. Furthermore, among the constituent elements described in the following embodiments, any constituent element that is not described in an independent claim indicating the broadest concept will be described as an optional constituent element.

First Embodiment

In a first embodiment, a plurality of illuminators sequentially illuminate a target object located on an image sensor, and an image of the target object on a virtual focal plane located between the plurality of illuminators and the image sensor is generated with the use of a plurality of captured images obtained by capturing an image of the target object each time the target object is illuminated. Hereinafter, this image generated with the use of a plurality of captured images will also be referred to as a focal image.

Configuration of Image Generating System

FIG. 1 is a functional block diagram of an image generating system according to a first embodiment. An image generating system 10 illustrated in FIG. 1 includes an image capturing apparatus 100A, an image generating apparatus 100B, a storage unit 120, and a display unit 150. The image generating system 10 may further include a first recording unit 111 that stores information on a predefined focal plane, a second recording unit 121 in which information on a pixel that has been subjected to refocus processing is recorded, and an input unit 112 that receives an input of specification information specifying a focal plane.

Configuration of Image Capturing Apparatus

First, the configuration of the image capturing apparatus 100A will be described. The image capturing apparatus 100A includes a plurality of illuminators 101, an image sensor 102, and an image capturing control unit 103. The image capturing apparatus 100A acquires a captured image (photographic image) of a target object. Herein, the image capturing apparatus 100A does not include a focusing lens. Typically, a focusing lens includes a plurality of lenses and mirrors and has a predetermined length or more in an optical axis direction. Therefore, it is practically difficult to dispose an image capturing apparatus having a focusing lens within an incubator for culturing a cell, for example. In addition, an environment in which a cell is cultured has high humidity. The materials for a lens and a mirror are not suitable for use in a high-humidity environment. Thus, an image capturing apparatus having a focusing lens is not suitable in an environment in which a cell is cultured. Therefore, with the use of an image capturing apparatus that does not include a focusing lens, it becomes possible to observe a cell even in an incubator, that is, in an environment in which a cell is cultured, for example.

The target object is, for example, a plurality of semi-transparent substances disposed on the image sensor 102. The plurality of substances are located so as to overlap one another three-dimensionally. A specific example of such substances is a cell.

Each of the plurality of illuminators 101 is an illuminator that outputs parallel light or an illuminator that outputs diffused light. The plurality of illuminators 101 include a first illuminator and a second illuminator. Each of the first illuminator and the second illuminator emits light rays that do not intersect with one another. In other words, a plurality of first light rays representing first light emitted by the first illuminator do not intersect with each other. In addition, a plurality of second light rays representing second light emitted by the second illuminator do not intersect with each other. Therefore, when light is emitted by either one of the first illuminator and the second illuminator, the light from the one of the first illuminator and the second illuminator reaches a pixel included in the image sensor 102 in a single direction. In other words, light does not reach a given pixel from two or more directions.

Hereinafter, such illumination will be referred to as non-intersecting illumination. The non-intersecting illumination can be achieved, for example, by parallel light or by diffused light from a point light source. The plurality of illuminators 101 sequentially emit light. The plurality of illuminators 101 are disposed at mutually different positions and irradiate the target object with light from mutually different directions.

The image sensor 102 includes a plurality of pixels. Each of the pixels of the image sensor 102 is disposed on a light receiving surface and acquires the intensity of light emitted by the plurality of illuminators 101. The image sensor 102 acquires a captured image on the basis of the intensity of the light acquired by each of the pixels. The image sensor 102 outputs the acquired image, for example, to the storage unit 120.

Examples of the image sensor 102 include a complementary metal-oxide semiconductor (CMOS) image sensor and a charge-coupled device (CCD) image sensor.

The image capturing control unit 103 controls light irradiation of the plurality of illuminators 101 and imaging of the image sensor 102. Specifically, the image capturing control unit 103 controls the order in which the plurality of illuminators 101 emit light and the time interval at which the plurality of illuminators 101 emit light. The image capturing control unit 103 is constituted by a computer system (not illustrated) composed of a central processing unit (CPU), a random access memory (RAM), a read-only memory (ROM), and so on. The functions of some or all of the constituent elements of the image capturing control unit 103 may be implemented by the CPU executing a program recorded on the ROM while using the RAM as a work memory. In addition, the functions of some or all of the constituent elements of the image capturing control unit 103 may be implemented by a dedicated hardware circuit.

Figure 2:
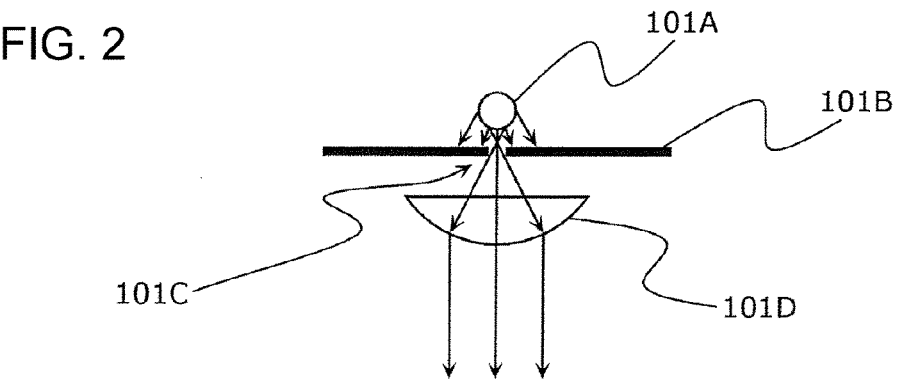
FIG. 2 schematically illustrates an example of the structure of an illuminator according to the first embodiment.

Light beams emitted by the plurality of illuminators 101 that are disposed at mutually different positions relative to the light receiving surface of the image sensor 102 are incident on the light receiving surface at different angles of incidence. When the plurality of illuminators 101 emit parallel light beams, the plurality of illuminators 101 emit parallel light beams having mutually different angles of incidence relative to the light receiving surface of the image sensor 102. As illustrated in FIG. 2, the parallel light is obtained, for example, by refracting, with a collimator lens 101D, the light that has been emitted by an LED light source 101A and has passed through a pinhole 101C formed in a shading plate 101B.

Figure 3:
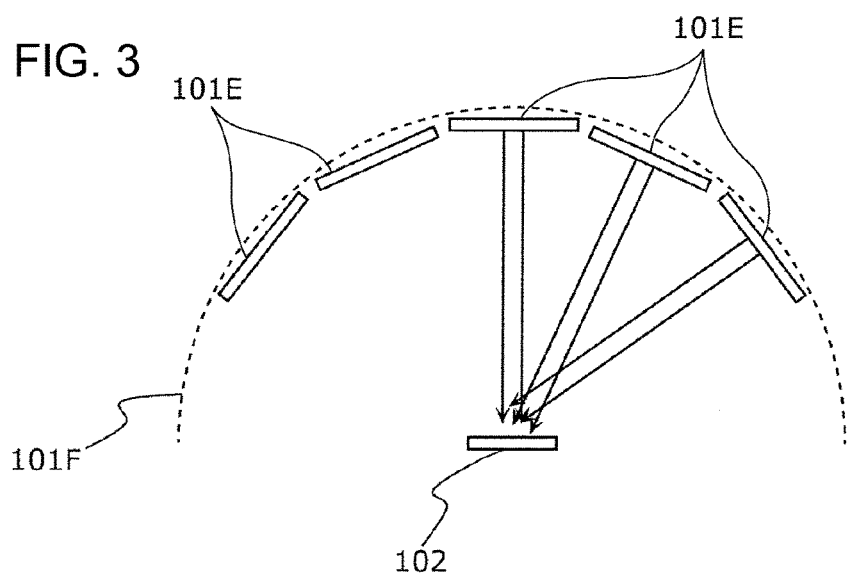
FIG. 3 schematically illustrates an example of the structure of an illuminator according to the first embodiment.

FIG. 3 is a schematic diagram for describing an example of the structure of the plurality of illuminators 101. In the example of the plurality of illuminators 101 illustrated in FIG. 3, a plurality of light sources 101E that emit parallel light are fixed at different angles relative to the light receiving surface of the image sensor 102. In the example illustrated in FIG. 3, the plurality of light sources 101E are disposed on the inner surface of a hemisphere 101F that covers the image sensor 102. The angles of incidence, onto the light receiving surface, of the light beams that reach the light receiving surface of the image sensor 102 from the plurality of light sources 101E are different from each other.

Figure 4:
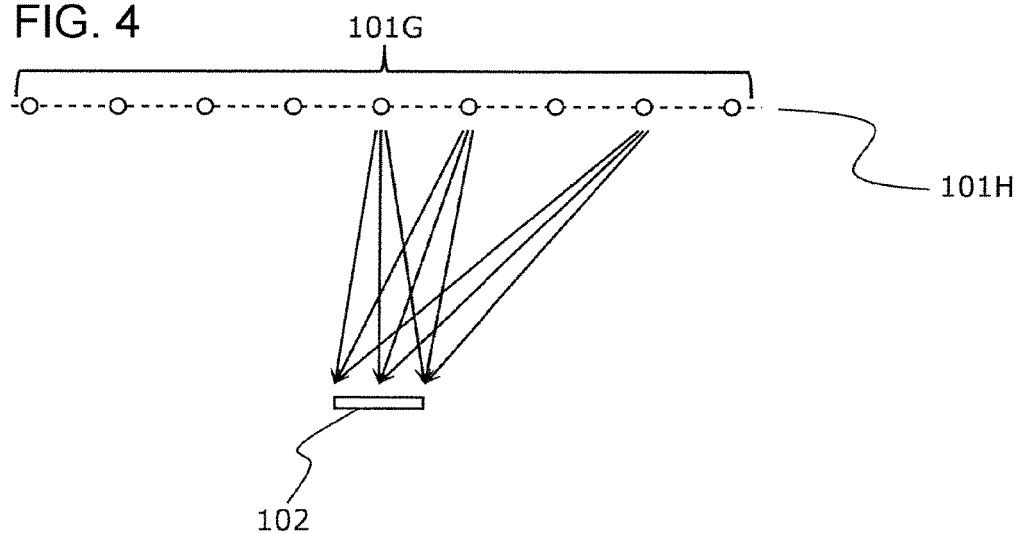
FIG. 4 schematically illustrates an example of the structure of an illuminator according to the first embodiment.

FIG. 4 is a schematic diagram for describing another example of the structure of the plurality of illuminators 101. In the example of the plurality of illuminators 101 illustrated in FIG. 4, a plurality of pseudo-point light sources 101G are disposed so as to face the image sensor 102 at mutually different positions on a plane 101H that is parallel to the light receiving surface of the image sensor 102. Light beams from the plurality of pseudo-point light sources 101E are incident on the respective pixels of the light receiving surface of the image sensor 102 from different directions.

Each of the plurality of pseudo-point light sources 101G is achieved, for example, by disposing the shading plate 101B having the pinhole 101C in the vicinity of the LED light source 101A. The size of the pinhole 101C is regulated by the pixel pitch of the image sensor 102, the distance between the image sensor 102 and the pinhole 101C, and the distance from the image sensor 102 to a point at which a focal image is generated.

FIG. 5 is a schematic diagram for describing the size condition that should be satisfied by the pinhole. In FIG. 5, d1 represents the diameter of the pinhole 101C, h1 represents the distance from the light receiving surface of the image sensor 102 to the pinhole 101C, h2 represents the distance from the light receiving surface of the image sensor 102 to a focal point 101J (i.e., a point located on a focal plane of a given pixel in a focal image), d2 represents the diameter of the divergence of the light that passes through the focal point and reaches the light receiving surface of the image sensor 102 from the pinhole 101C, and p represents the pixel pitch of the image sensor 102.

In this case, the light that has exited the pinhole 101C ideally passes through the focal point 101J and reaches a single point on the light receiving surface of the image sensor 102. In other words, it is desirable that the light that has exited the pinhole 101C pass through the focal point 101J and reach only a single pixel of the image sensor 102. Therefore, it is desirable that d2 be a size that does not exceed the pixel pitch p of the image sensor 102. In other words, d2<p is the condition for achieving the non-intersecting illumination, as in the following expression (1).

$$d2 = \frac{d1 \cdot h2}{h1 - h2} < p \quad (1)$$

The condition that d1 should satisfy can be expressed through the following expression (2) by modifying the expression (1).

$$d1 < \frac{p(h1 - h2)}{h2} \quad (2)$$

For example, when the pixel pitch p is 0.001 mm, the distance h1 from the light receiving surface of the image sensor 102 to the pinhole 101C is 2 mm, and the distance h2 from the image sensor 102 to the focal point 101J is 0.1 mm, it is desirable that the diameter d1 of the pinhole 101C be less than 0.19 mm.

Configuration of Image Generating Apparatus

Next, the configuration of the image generating apparatus 100B will be described. The image generating apparatus 100B is implemented by at least one control circuit. As illustrated in FIG. 1, the image generating apparatus 100B includes a focal plane determining unit 110, a refocus processing unit 130, and an image generating unit 140.

The focal plane determining unit 110 is implemented, for example, by a control circuit or by a processor and determines a virtual focal plane located between the plurality of illuminators 101 and the image sensor 102. Specifically, the focal plane determining unit 110 determines the focal plane, for example, on the basis of the information on the predefined focal plane recorded in the first recording unit 111. In addition, the focal plane determining unit 110 may determine the focal plane, for example, in accordance with the information input from the outside via the input unit 112.

The storage unit 120 is implemented, for example, by a semiconductor memory, a hard disk drive, or the like and stores an image captured by the image sensor 102 along the positional information of the illuminator used to capture that image.

FIG. 6 illustrates an example of the content stored in the storage unit 120. For each image file captured by the image sensor 102, the positional information of the illuminator used to acquire that image file is stored. In the example illustrated in FIG. 6, the positional information of the illuminator indicates the relative position with respect to the image sensor 102. Hereinafter, this positional information of the illuminator is also referred to as illumination position information. The illumination position information is stored along with the file ID of the image file and is linked to the image data via the file ID. The illumination position information may be recorded in a portion of the image file (e.g., header information).

The refocus processing unit 130 is implemented, for example, by a control circuit or a processor and calculates the intensity of the light for each of the pixels constituting a focal image on the focal plane from the plurality of images, the positional information of the plurality of illuminators 101, and the information on the virtual focal plane. Details of this refocus processing will be described later.

The image generating unit 140 is implemented, for example, by a control circuit or a processor and generates a focal image on the focal plane from the luminance value for each of the pixels calculated by the refocus processing unit 130.

The display unit 150 is implemented by a display and displays the focal image generated by the image generating unit 140.

Operation of Image Generating System

Figure 7:
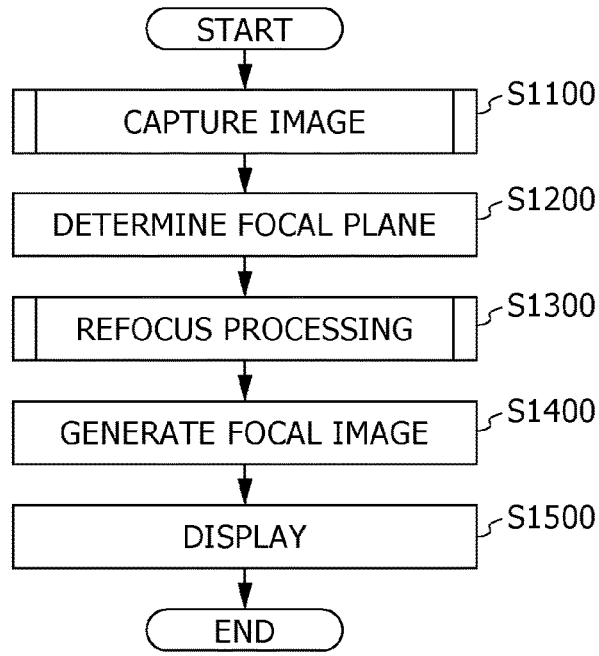
FIG. 7 is a flowchart illustrating an example of the operation of the image generating system according to the first embodiment.
Figure 8:
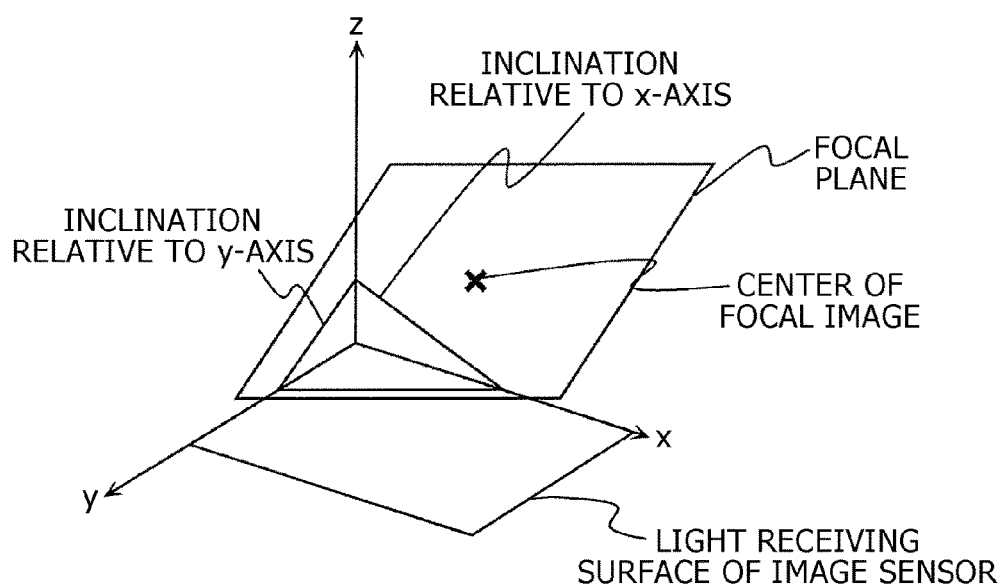
FIG. 8 is a schematic diagram illustrating an example of the relationship between the coordinates and a focal plane.

Next, the operation of the image generating system 10 configured as described above will be described. FIG. 7 is a flowchart illustrating an example of the operation of the image generating system 10 according to the first embodiment. FIG. 8 is a schematic diagram illustrating an example of the relationship between the coordinates and the focal plane.

Step S1100

First, the image capturing apparatus 100A illuminates a target object by sequentially using the plurality of illuminators 101 and captures a plurality of images of the target object. Specifically, the image capturing apparatus 100A acquires an image of the target object by recording the intensity of the light that has reached the light receiving surface of the image sensor 102 each time one of the plurality of illuminators 101 illuminates the target object. The acquired image is stored in the storage unit 120 along with the positional information of the illuminator that has illuminated the target object when the image is captured. Herein, the positions of the plurality of illuminators 101 are fixed relative to the image sensor 102, and the positional information of each of the plurality of illuminators 101 is predefined. Details of the image capturing processing will be described later.

Step S1200

The focal plane determining unit 110 determines a focal plane. Specifically, the focal plane determining unit 110 determines the position and the inclination (angle) of the focal plane relative to the image sensor 102. For example, the focal plane determining unit 110 may determine the focal plane on the basis of the information on the predefined focal plane stored in the first recording unit 111. Alternatively, the focal plane determining unit 110 may determine the focal plane on the basis of the specification information specifying the focal plane received from a user through the input unit 112.

The focal plane corresponds to a virtual plane on which a focal image is generated. In other words, a plurality of pixels included in the focal image of the target object on the focal plane correspond to respective points on the focal plane.

For example, the focal plane determining unit 110 determines the focal plane by using the angle and the position of the focal plane. The angle and the position of the focal plane are defined, for example, by the xyz-space illustrated in FIG. 8.

In FIG. 8, the xy-plane coincides with the light receiving surface of the image sensor 102. The z-axis is orthogonal to the light receiving surface of the image sensor 102. In this case, the angle of the focal plane is defined by the angles relative to the x-axis and to the y-axis in the xyz-space with its origin lying at the center of the light receiving surface of the image sensor 102. The position of the focal plane is defined by the coordinates of the center point of the focal plane.

Step S1300

The refocus processing unit 130 carries out refocus processing on the basis of the plurality of captured images, the positional information of the plurality of illuminators 101, and the information on the focal plane and obtains the luminance of each point on the focal plane. Details of the refocus processing will be described later.

Step S1400

The image generating unit 140 generates image data that can be output to a display or the like on the basis of the result of the refocus processing carried out in step S1300. The image generating unit 140 outputs the generated image data to the display unit 150.

Step S1500

Figure 9:
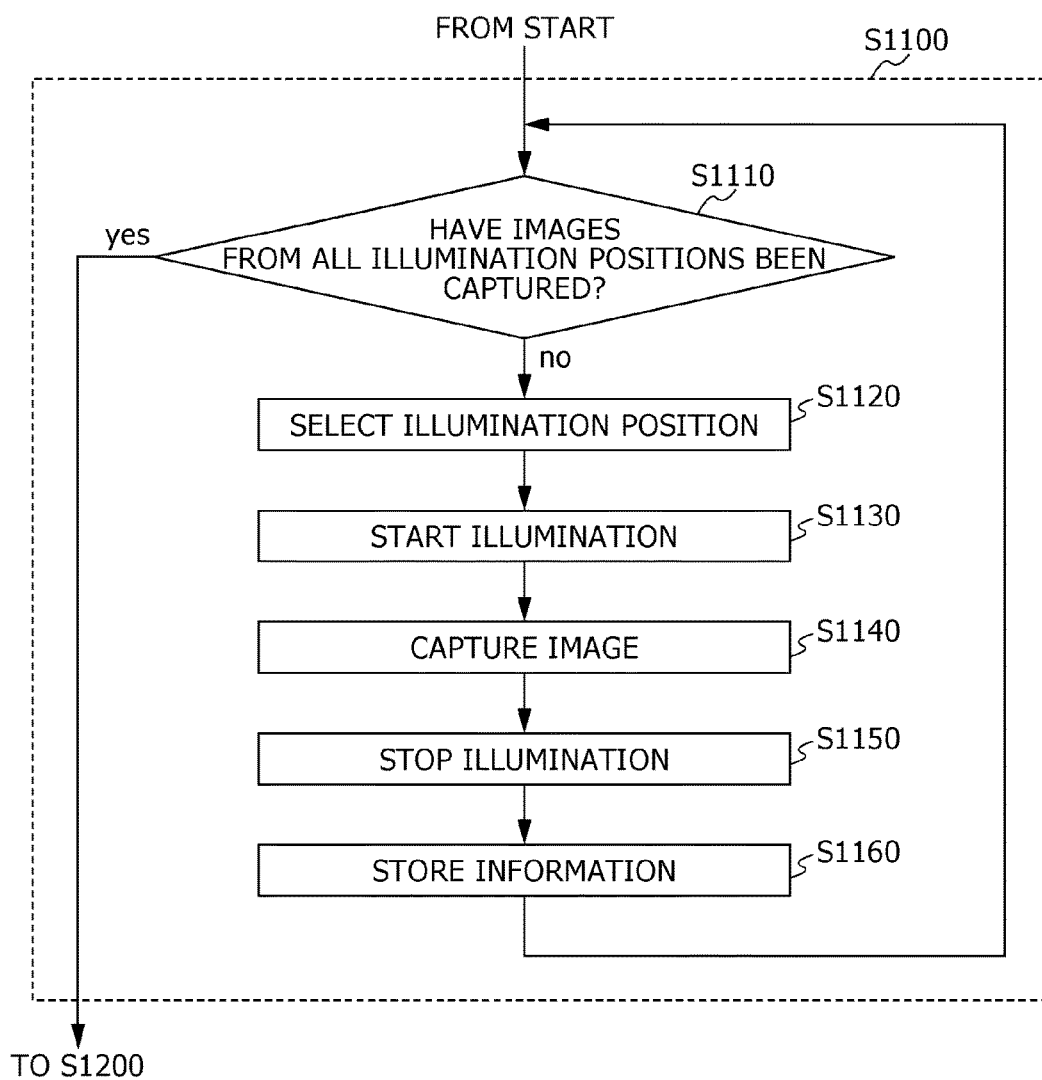
FIG. 9 is a flowchart illustrating an example of the operation of an image capturing apparatus according to the first embodiment.

The display unit 150 displays the image generated in step S1400. Image Capturing Processing Now, the operation of the image capturing apparatus 100A in step S1100 will be described in detail. FIG. 9 is a flowchart illustrating an example of the operation of the image capturing apparatus 100A.

Step S1110

The image capturing control unit 103 determines whether the images of the target object illuminated from the respective illumination positions have been captured by referring to a list of the plurality of predefined illumination positions or of a plurality of illumination positions specified through an external input (not illustrated) (hereinafter, referred to as an illumination position list).

Here, if the images have been captured with illumination from all of the illumination positions included in the illumination position list (yes in step S1110), the processing proceeds to step S1200. Meanwhile, if there is an image that has not been captured with illumination from any one of the illumination positions on the illumination position list (no in step S1110), the processing proceeds to step S1120.

Step S1120

The image capturing control unit 103 selects, from the plurality of illumination positions included in the illumination position list, an illumination position from which the target object has not been illuminated and outputs a control signal to the plurality of illuminators 101. In the illumination position list, each illumination position is indicated, for example, by a number assigned to each of the illumination positions. Alternatively, each illumination position is indicated, for example, by a coordinate value in the xyz-space illustrated in FIG. 8. The illumination position is selected, for example, in ascending order from the list.

Step S1130

The plurality of illuminators 101 start illuminating the target object in accordance with the control signal output from the image capturing control unit 103 in step S1120. In other words, the illuminator that is at the illumination position selected in step S1120 starts emitting light.

Step S1140

While the target object is illuminated by the illuminator, the image sensor 102 acquires an image formed by the light from the illuminator that has been transmitted through the target object.

Step S1150

Thereafter, the image capturing control unit 103 outputs a control signal to the plurality of illuminators 101 and stops the illumination of the target object. The illumination does not have to be stopped in accordance with the control signal from the image capturing control unit 103. For example, the plurality of illuminators 101 may measure the duration from when the illumination is started and may actively stop the illumination upon the measured duration exceeding a predefined duration. Alternatively, after the image sensor 102 has finished acquiring an image in step S1140, the image sensor 102 may output a control signal for stopping the illumination to the plurality of illuminators 101.

Step S1160

Subsequently, the image capturing control unit 103 outputs the image acquired in step S1140 and the positional information of the illuminator used in step S1130 to the storage unit 120. Then, the storage unit 120 stores the image data and the information on the illumination position such that they are associated with each other. After step S1160, the processing returns to step S1110.

As the processing in steps S1110 through S1160 is repeated, the target object is illuminated sequentially with light from the illuminators at all of the illumination positions included in the illumination position list, and an image is acquired each time the target object is illuminated with the light.

Refocus Processing

Figure 10:
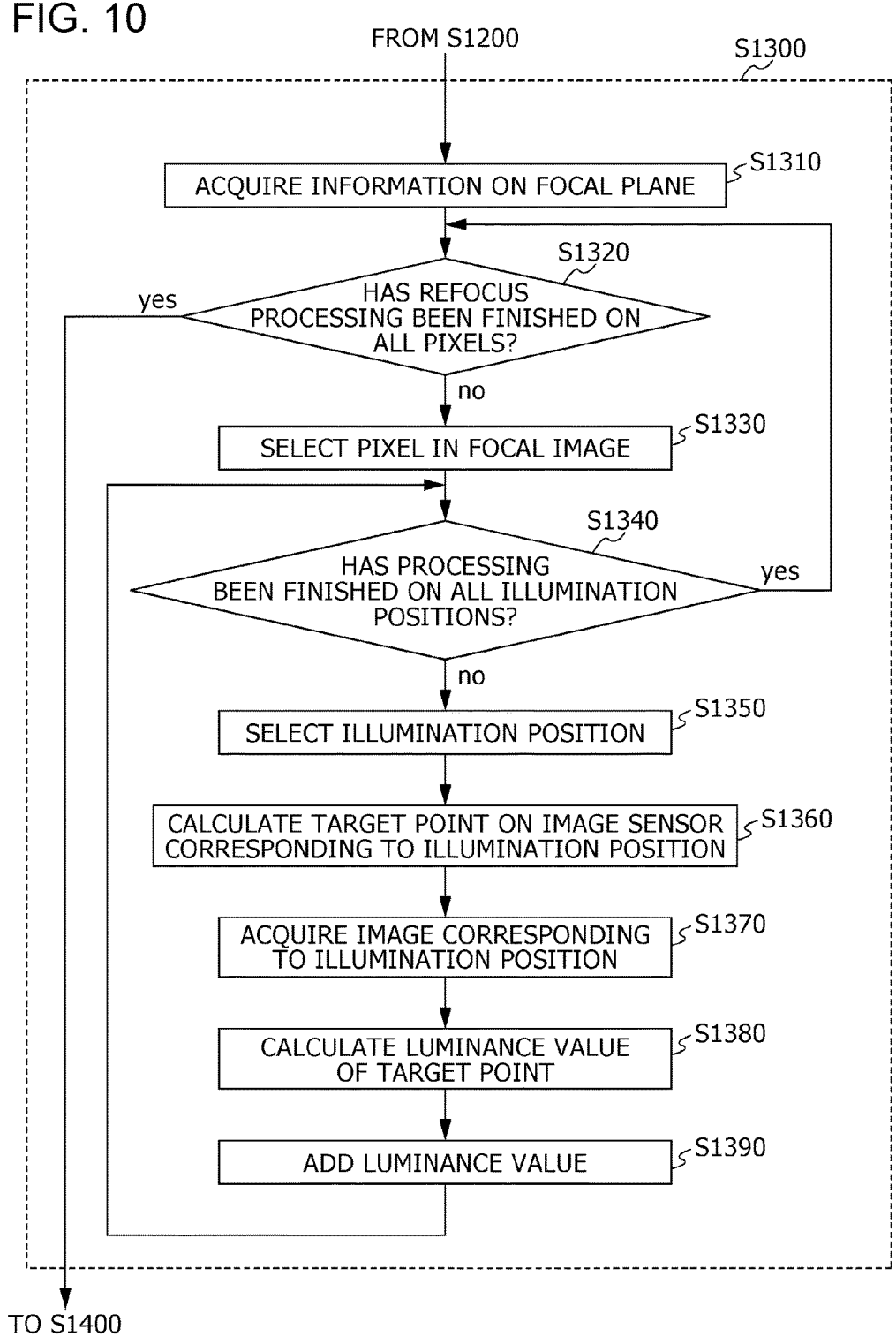
FIG. 10 is a flowchart illustrating an example of the operation of a refocus processing unit according to the first embodiment.

The operation of the refocus processing unit 130 in step S1300 will be described in detail. FIG. 10 is a flowchart illustrating an example of the operation of the refocus processing unit 130 according to the first embodiment. FIGS. 11 through 15 are schematic diagrams for describing a specific example of a calculation method in the refocus processing.

Hereinafter, each step in FIG. 10 will be described with reference to FIGS. 11 through 15.

Step S1310

The refocus processing unit 130 acquires the information on the focal plane determined in step S1200 from the focal plane determining unit 110.

The information on the focal plane includes, for example, the coordinate value of the center of the focal plane and the value that indicates the inclination of the focal plane. The inclination of the focal plane is expressed, for example, by an angle formed by the x-axis and a line of intersection of the focal plane and the xz-plane. In addition, the inclination of the focal plane is expressed, for example, by an angle formed by the y-axis and a line of intersection of the focal plane and the yz-plane. The coordinate value of the center of the focal plane is a coordinate value of a point on the focal plane that corresponds to a pixel at the center of the focal image.

Figure 11:
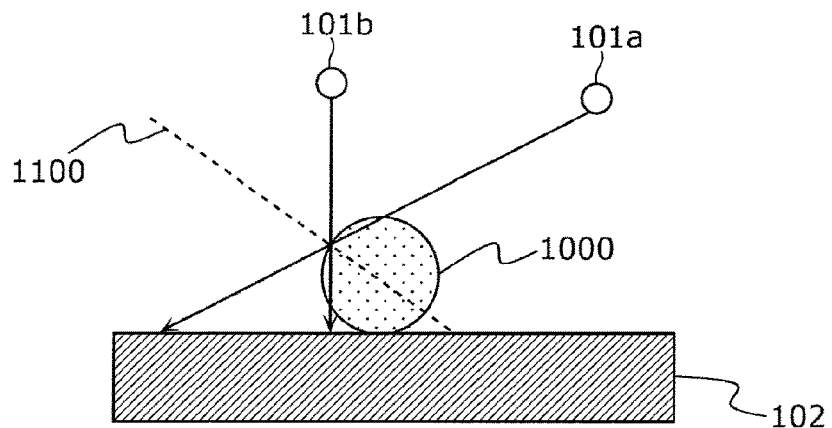
FIG. 11 is a schematic diagram for describing a specific example of refocus processing according to the first embodiment.

FIG. 11 illustrates an example of a sectional view of the image sensor 102 and a target object 1000 taken along the xz-plane. The target object 1000 is located between illuminators 101a, 101b and the image sensor 102 and is located on the image sensor 102. The refocus processing unit 130 acquires information on a focal plane 1100.

Step S1320

The refocus processing unit 130 determines whether the refocus processing has been finished on all of the pixels included in the focal image. Here, the refocus processing refers to the processing in steps S1320 through S1390.

If the refocus processing has been finished on all of the pixels included in the focal image (yes in step S1320), the refocus processing unit 130 terminates the refocus processing (proceeds to step S1400).

If there is a pixel, among the pixels included in the focal image, on which the refocus processing has not been finished (no in step S1320), the refocus processing unit 130 continues with the refocus processing (proceeds to step S1330).

Figure 12:
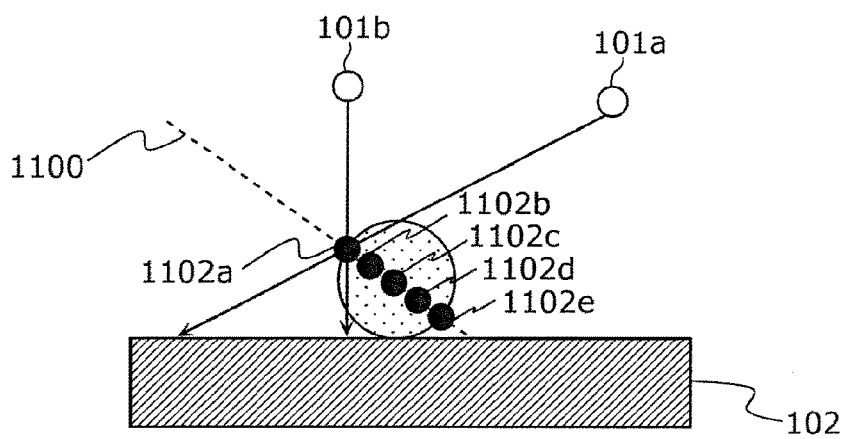
FIG. 12 is a schematic diagram for describing a specific example of the refocus processing according to the first embodiment.

The focal image includes a plurality of pixels. The plurality of pixels included in the focal image correspond to the respective points on the focal plane. FIG. 12 illustrates a plurality of points 1102a through 1102e on the focal plane 1100 that correspond to the respective pixels included in the focal image. The plurality of points 1102a through 1102e on the focal plane 1100 illustrated in FIG. 12 are points on the target object 1000, but the plurality of points 1102a through 1102e on the focal plane 1100 do not have to be points on the target object 1000 or on a plane that passes through the target object 1000. A point other than a point on the target object 1000 or on a plane that passes through the target object 1000 may correspond to a pixel of the focal image.

Step S1330

The refocus processing unit 130 selects one pixel from the plurality of pixels included in the focal image. The one pixel selected here is a pixel, among the plurality of pixels included in the focal image, on which the refocus processing has not been carried out. The initial value of the pixel value of the focal image is 0.

Figure 13:
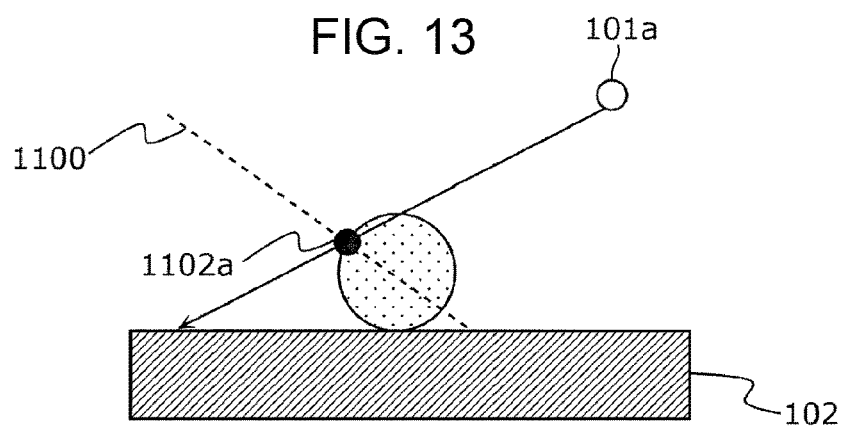
FIG. 13 is a schematic diagram for describing a specific example of the refocus processing according to the first embodiment.

For example, information on the pixels in the focal image on which the refocus processing has been carried out is stored in the second recording unit 121 illustrated in FIG. 1. After the processing in step S1390, which will be described later, the refocus processing unit 130 records the information on the pixel that has been subjected to the refocus processing into the second recording unit 121. The refocus processing unit 130 selects a pixel on which the refocus processing has not been carried out by referring to the information on the pixels recorded in the second recording unit 121. Hereinafter, a case in which a pixel corresponding to the point 1102a is selected as illustrated in FIG. 13 will be described. In addition, the pixel corresponding to the point 1102a is referred to as a selected pixel as well.

Step S1340

The refocus processing unit 130 determines whether adding processing has been finished on all of the illumination positions.

Here, if the adding processing has been finished on all of the illumination positions (yes in step S1340), the processing of the refocus processing unit 130 returns to step S1320.

Meanwhile, if there is an illumination position on which the adding processing has not been finished (no in step S1340), the refocus processing unit 130 continues with the adding processing (proceeds to step S1350). Here, the adding processing refers to the processing in steps S1340 through S1390.

Step S1350

The refocus processing unit 130 selects an illumination position, among all of the illumination positions used to capture the images, on which the adding processing has not been finished.

Step S1360

The refocus processing unit 130 calculates the position of a point at which a straight line passing through the selected illumination position and the position of the selected pixel on the focal plane intersects with the light receiving surface of the image sensor 102.

Figure 14:
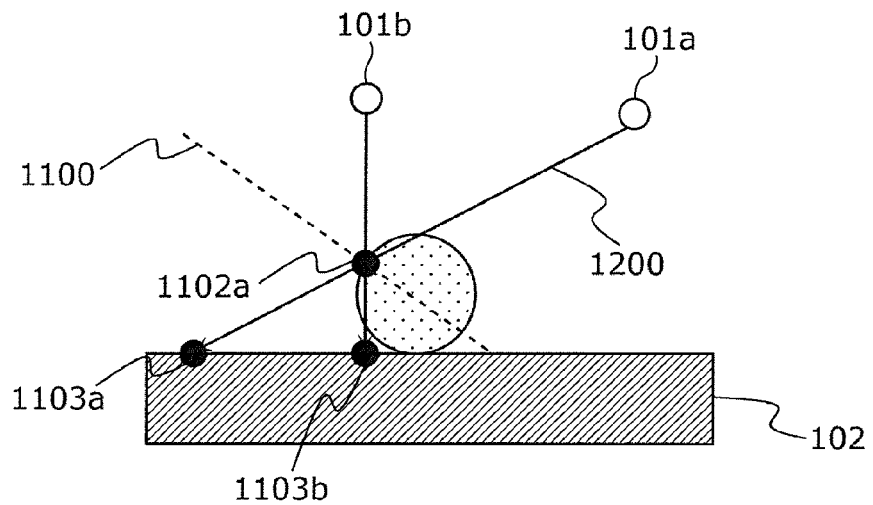
FIG. 14 is a schematic diagram for describing a specific example of the refocus processing according to the first embodiment.

FIG. 14 illustrates a point of intersection 1103a of the light receiving surface of the image sensor 102 and a straight line 1200 passing through the position of the illuminator 101a and the point 1102a corresponding to the selected pixel. Hereinafter, the point of intersection 1103a is also referred to as a target point, which is a point that is to be subjected to the adding processing. Here, the position of the illuminator 101a illustrated in FIG. 14 corresponds, for example, to the position of one light source among the plurality of pseudo-point light sources 101G illustrated in FIG. 4 or to the position of one light source among the plurality of parallel-light light sources 101E illustrated in FIG. 3. To be more specific, the illuminator 101a illustrated in FIG. 14 is at a point of intersection of a straight line that is orthogonal to the surface of the light source 101E and passes through the point 1102a and the plane of the light source 101E.

A target point on the light receiving surface of the image sensor 102 is expressed, for example, by the coordinate value on the xy-plane illustrated in FIG. 8.

Step S1370

The refocus processing unit 130 acquires the image corresponding to the selected illumination position from the storage unit 120. In other words, the refocus processing unit 130 acquires, from the storage unit 120, the image captured by using the illuminator located at the selected illumination position. Specifically, the refocus processing unit 130 acquires the image stored in the storage unit 120 in accordance with the correspondence relationship between the illumination position information and the images illustrated in FIG. 6. For example, the refocus processing unit 130 acquires the image corresponding to the position of the illuminator 101a illustrated in FIG. 13.

Step S1380

The refocus processing unit 130 determines the position of the target point on the image sensor 102 calculated in step S1360 in the captured image. Specifically, the refocus processing unit 130 determines the position of the target point in the captured image on the basis of the arrangement of the pixels in the captured image.

When the position of the target point in the captured image is at an intermediate position between a plurality of pixels, the refocus processing unit 130 calculates the luminance value of the target point in the captured image by carrying out interpolation processing with the use of the luminance values of the plurality of pixels adjacent to the position of the target point. Specifically, the refocus processing unit 130, for example, obtains the distance between the target point and each of the plurality of pixels (e.g., four pixels) adjacent to the target point, multiplies the luminance value of each pixel by the ratio of the distance between the target point and each pixel, adds the multiplied results, and thus obtains the luminance value of the target point in the captured image.

Figure 15:
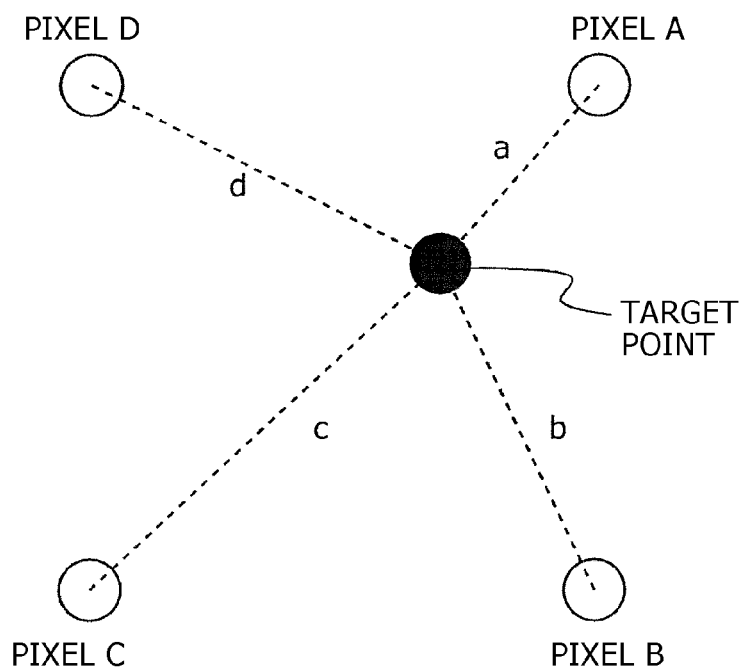
FIG. 15 is a schematic diagram for describing a specific example of the refocus processing according to the first embodiment.

FIG. 15 is a schematic diagram for describing the calculation of the luminance value of the target point in step S1380. In FIG. 15, the distances between four pixels A through D adjacent to the target point and the target point are represented by a, b, c, and d, respectively. In this case, the luminance value Lt of the target point is obtained through the following expression (3).

$$L_t = \left(\frac{L_a}{a} + \frac{L_b}{b} + \frac{L_c}{c} + \frac{L_d}{d}\right) \times (a + b + c + d) \quad (3)$$

Here, La, Lb, Lc, and Ld represent the luminance values of the pixel A, the pixel B, the pixel C, and the pixel D, respectively.

Step S1390

The refocus processing unit 130 adds the luminance value of the target point calculated in step S1390 to the luminance value of the selected pixel in the focal image.

By repeating the processing in steps S1340 through S1390, the result in which the luminance values of the target points in the captured images are added to the luminance values of the selected pixels for all of the illumination positions is calculated as the luminance value of the selected pixel.

Through such adding processing, for each point on the focal plane, a plurality of images formed by the light from a plurality of directions that has passed through the point are superimposed on a single pixel in the focal image.

In FIG. 14, the light emitted by the illuminator 101a passes through the point 1102a on the focal plane 1100 that corresponds to the selected pixel and reaches the target point (point of intersection 1103a) on the light receiving surface of the image sensor 102. Therefore, an image at the point 1102a on the focal plane 1100 is included at the position of the target point (point of intersection 1103a) in the image captured with the illuminator 101a.

In addition, in FIG. 14, the light emitted by the illuminator 101b passes through the point 1102a on the focal plane 1100 that corresponds to the selected pixel and reaches a target point (point of intersection 1103b) on the light receiving surface of the image sensor 102. Therefore, an image at the point 1102a on the focal plane 1100 is included at the position of the target point (point of intersection 1103b) in the image captured with the illuminator 101b.

As such an image (luminance value) at the target point (point of intersection 1103a) and the image (luminance value) at the target point (point of intersection 1103b) are added, a plurality of images formed by the light from a plurality of directions are superimposed on the selected pixel of the focal image.

Advantageous Effects

As described thus far, according to the image generating system according to the present embodiment, the luminance value of a target point, which is a point of intersection of the light receiving surface of the image sensor 102 and a straight line connecting the position of a pixel on the focal plane and the position of the illuminator, can be applied to the luminance value of the stated pixel. Accordingly, the luminance values of a plurality of captured images corresponding to the pixel can be reflected on each pixel of the focal image on the virtual focal plane, and a high-quality focal image of the target object can be generated.

First Modification of First Embodiment

Next, a first modification of the first embodiment will be described. Although the illumination position is selected in step S1350 of FIG. 10 in the above-described first embodiment, a captured image is selected in the present modification. Hereinafter, the first modification of the first embodiment will be described with the description centered on the differences from the first embodiment.

Figure 16:
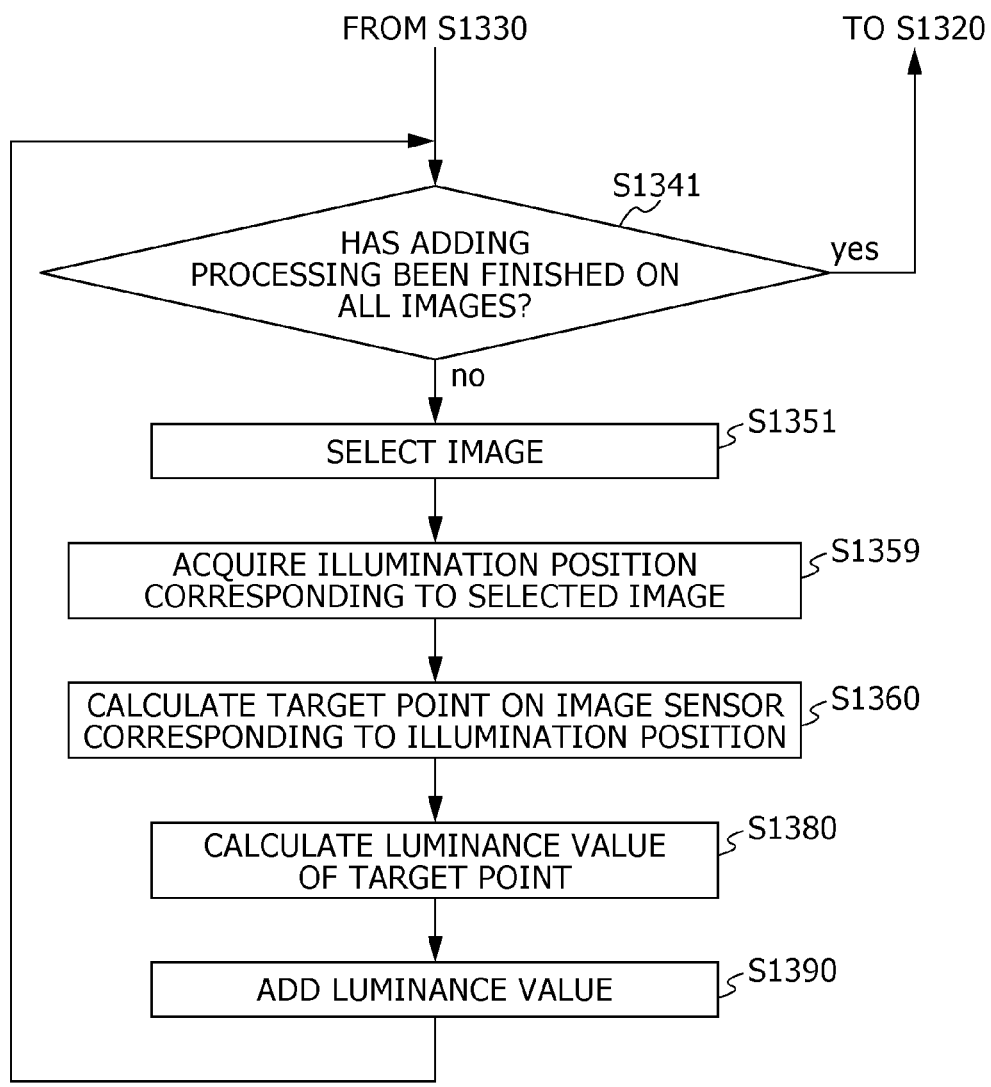
FIG. 16 is a flowchart illustrating an example of the operation of a refocus processing unit according to a first modification of the first embodiment.

FIG. 16 is a flowchart illustrating an example of the operation of the refocus processing unit according to the first modification of the first embodiment. In FIG. 16, in place of steps S1340 through S1390 of FIG. 10, steps S1341 through S1390 are carried out. In FIG. 16, steps that are substantially identical to the steps in FIG. 10 are given identical reference numerals, and descriptions thereof will be omitted as appropriate.

In FIG. 16, if all of the captured images have been used for the adding processing (yes in step S1341), the processing returns to step S1320. Meanwhile, if there is a captured image that has not been used for the adding processing (no in step S1341), the processing proceeds to step S1351. The refocus processing unit 130 selects one of the captured images stored in the storage unit 120 (step S1351). Here, a captured image that has not been used for the adding processing is selected.

The refocus processing unit 130 acquires, from the storage unit 120, the illumination position information corresponding to the captured image selected in step S1351 (step S1359). The operation thereafter is the same as the operation illustrated in FIG. 9 except in that the operation of acquiring an image in step S1370 is not carried out.

As described above, according to the image generating system according to the present modification, even when a captured image is selected instead of selecting the illumination position, the luminance values of a plurality of captured images corresponding to the pixel can be applied to each pixel of the focal image, and a high-quality focal image of the target object can be generated, as in the first embodiment.

Second Modification of First Embodiment

Next, a second modification of the first embodiment will be described. Although the pixels in the focal image are selected sequentially in step S1320 and step S1330 of FIG. 10 in the above-described first embodiment, pixels in a captured image are selected sequentially in the present modification. In other words, the present modification differs from the above-described first embodiment in that a pixel in a captured image is selected first and a point on the focal plane that corresponds to the selected pixel is determined later. The luminance value of the selected pixel in the captured image is reflected on the pixel within the focal image that corresponds to the point on the focal plane determined in this manner. Hereinafter, the second modification of the first embodiment will be described with the description centered on the differences from the first embodiment.

Figure 17:
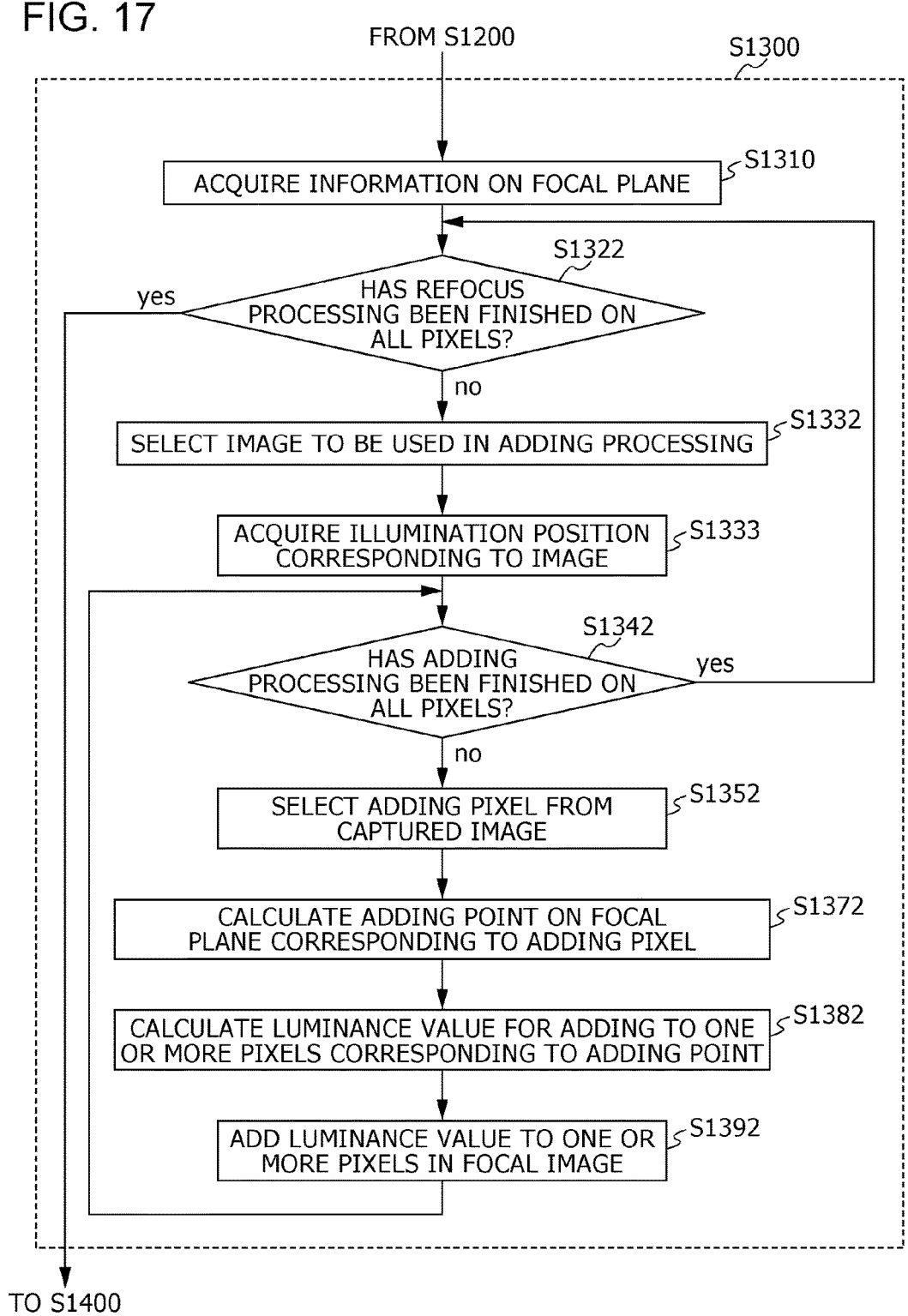
FIG. 17 is a flowchart illustrating an example of the operation of a refocus processing unit according to a second modification of the first embodiment.

FIG. 17 is a flowchart illustrating an example of the operation of the refocus processing unit according to the second modification of the first embodiment. In FIG. 17, steps that are substantially identical to the steps in FIG. 10 are given identical reference numerals, and descriptions thereof will be omitted as appropriate.

Step S1322

The refocus processing unit 130 determines whether the refocus processing has been finished on all of the images captured in step S1100. The refocus processing refers to the processing in steps S1322 through S1392. If the refocus processing has been finished on all of the images (yes in step S1322), the refocus processing unit 130 proceeds to step S1400. If there is an image, among the images captured in step S1100, on which the refocus processing has not been finished (no in step S1322), the processing proceeds to step S1332.

Step S1332

The refocus processing unit 130 selects one captured image from the images captured in step S1100 that are stored in the storage unit 120 (step S1332). The one captured image selected here is an image on which the refocus processing has not been carried out. Hereinafter, the one image selected in step S1332 is referred to as a selected image.

Step S1333

The refocus processing unit 130 acquires the illumination position information corresponding to the selected image. For example, the refocus processing unit 130 acquires the illumination position information by referring to the correspondence relationship between the images and the illumination position information illustrated in FIG. 6. Here, a case in which the positional information of the illuminator 101a is acquired will be described.

Step S1342

The refocus processing unit 130 determines whether the adding processing has been finished on all of the pixels in the selected image (step S1342). If the adding processing has been finished on all of the pixels in the selected image (yes in step S1342), the adding processing is terminated, and the processing returns to step S1322. Meanwhile, if there is a pixel, among the pixels in the selected image, on which the adding processing has not been finished (no in step S1342), the processing proceeds to step S1352. The adding processing refers to the processing in steps S1342 through S1392.

Step S1352

The refocus processing unit 130 selects one pixel in the selected image. The one pixel selected here is a pixel on which the adding processing has not been carried out.

Figure 18:
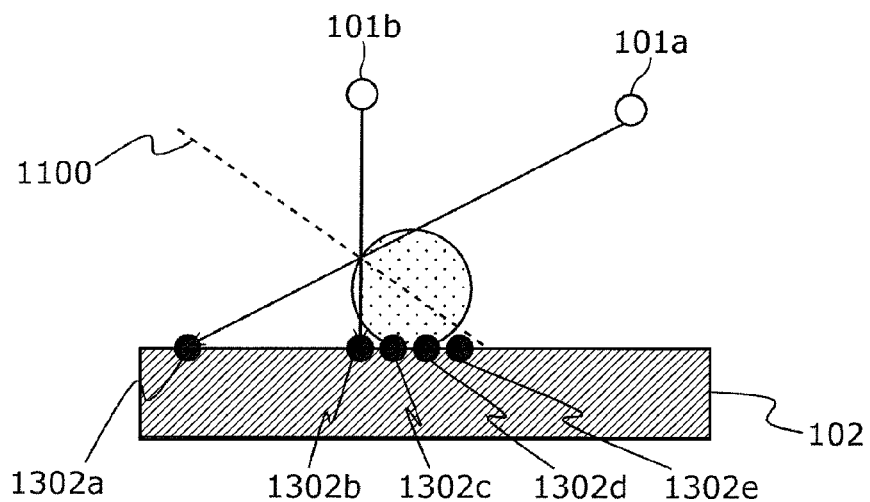
FIG. 18 is a schematic diagram for describing a specific example of refocus processing according to the second modification of the first embodiment.
Figure 19:
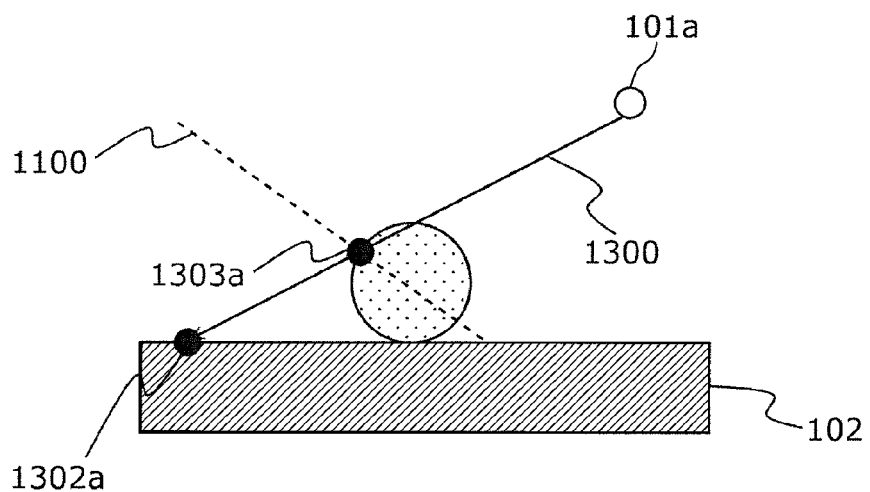
FIG. 19 is a schematic diagram for describing a specific example of the refocus processing according to the second modification of the first embodiment.

FIG. 18 illustrates a plurality of points 1302a through 1302e on the light receiving surface that correspond to a plurality of pixels included in the selected image. Here, a case in which the pixel corresponding to the point 1302a on the light receiving surface is selected from the selected image as illustrated in FIG. 19 will be described. Hereinafter, the pixel selected in step S1352 is also referred to as an adding pixel.

Step S1372

As illustrated in FIG. 19, the refocus processing unit 130 calculates the position of a point of intersection 1303a at which a straight line 1300 connecting the point 1302a on the light receiving surface and the position of the illuminator 101a intersects with the focal plane 1100. Hereinafter, the point of intersection 1303a is also referred to as an adding point.

Step S1382

The refocus processing unit 130 adds the luminance value of the adding pixel within the selected image that corresponds to the point 1302a on the light receiving surface to the luminance value of one or more pixels within the focal image that correspond to the adding point (point of intersection 1303a) on the focal plane.

For example, in a case in which the position of the point of intersection 1303a does not match the position of any of the pixels (integer pixels) in the focal image, the refocus processing unit 130 calculates the luminance values to be added to a plurality of pixels adjacent to the point of intersection 1303a in the focal image. Specifically, the refocus processing unit 130 determines the position within the focal image that corresponds to the adding point (point of intersection 1303a) on the focal plane calculated in step S1372 on the basis of the arrangement of the pixels in the focal image.

Figure 20:
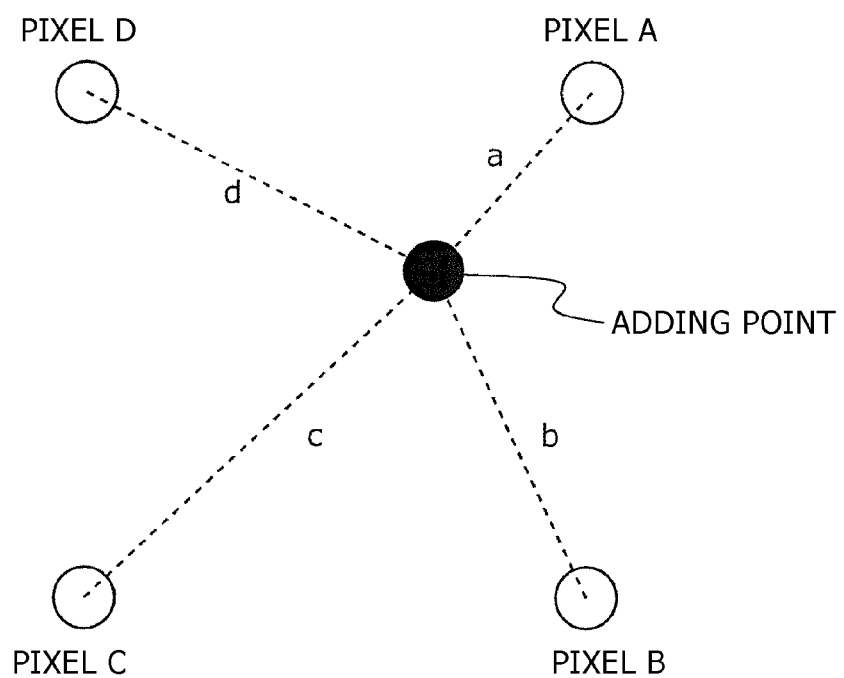
FIG. 20 is a schematic diagram for describing a specific example of the refocus processing according to the second modification of the first embodiment.

For example, as illustrated in FIG. 20, the position surrounded by the four pixels (the pixel A through the pixel D) in the focal image is determined to be the position of the adding point. In this case, the refocus processing unit 130 calculates the distance between the adding point and each of the pixels (the pixel A through the pixel D) adjacent to the adding point in the focal image. The refocus processing unit 130 calculates the luminance value to be added to each of the pixels adjacent to the adding point by using the calculated distance and the luminance value of the adding pixel. For example, the refocus processing unit 130 calculates the luminance value to be added to each of the pixels such that the luminance value becomes relatively larger for a pixel adjacent to the adding point in the focal image whose distance to the adding point is relatively larger. Specifically, the refocus processing unit 130 calculates, for example, the luminance value La to be added to the pixel A through the following expression (4).

$$L_a = \frac{a+b+c+d}{a} \times L \qquad (4)$$

Here, a is the distance between the pixel A and the adding point in the focal image, b is the distance between the pixel B and the adding point in the focal image, c is the distance between the pixel C and the adding point in the focal image, d is the distance between the pixel D and the adding point, and L is the luminance value of the adding pixel included in the captured image.

Step S1392

The refocus processing unit 130 adds the luminance value calculated in step S1382 to the luminance value of one or more pixels in the focal image.

By repeating the processing in steps S1342 through S1392, the luminance values of all of the pixels in the selected image can be reflected on the luminance values of the pixels in the focal image.

Furthermore, by repeating the processing in steps S1322 through S1392, the adding processing is carried out on all of the pixels in all of the captured images, and a focal image on the focal plane can be generated.

Figure 21:
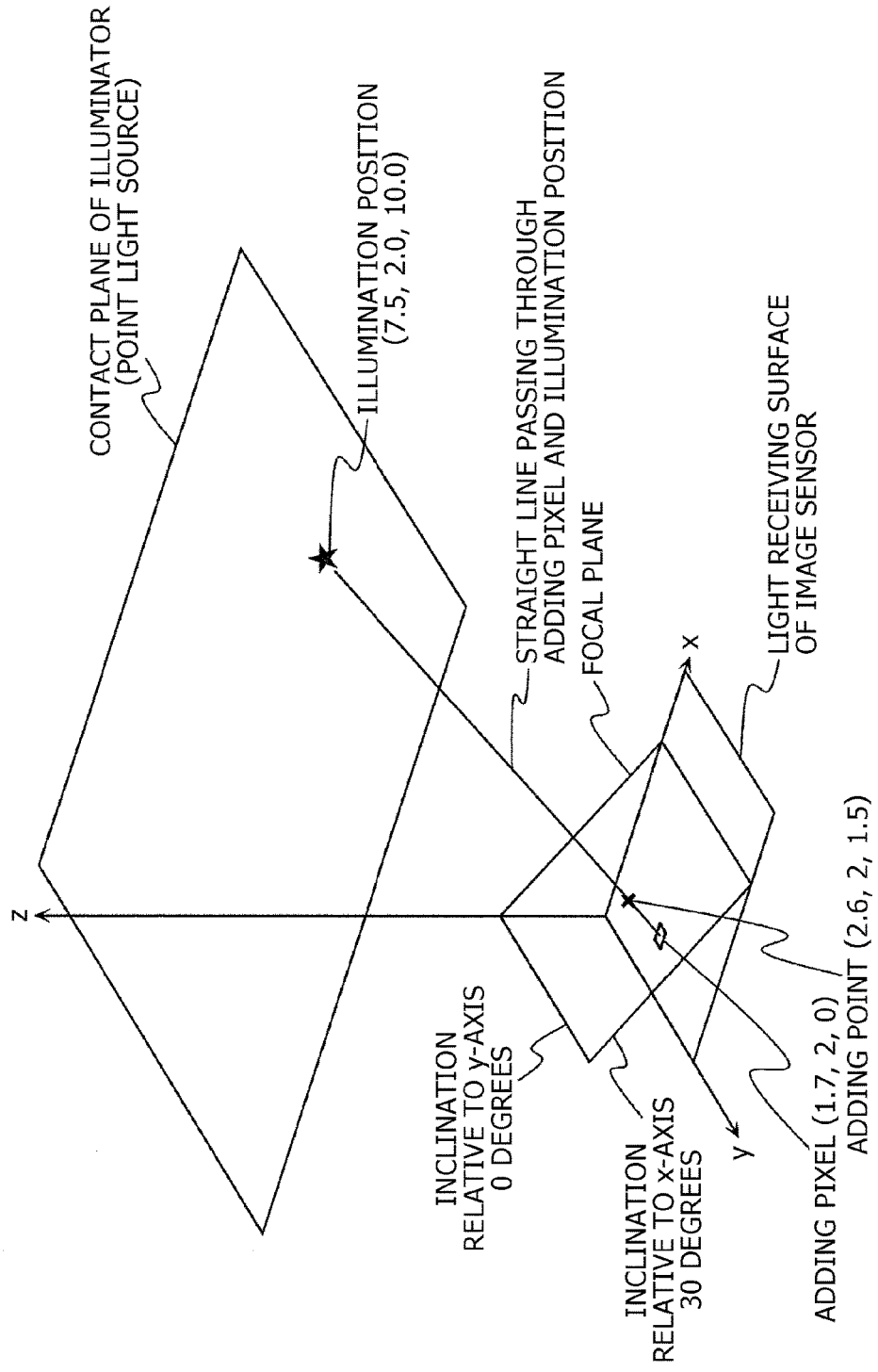
FIG. 21 is a schematic diagram for describing a specific example of the refocus processing according to the second modification of the first embodiment.

Specific examples of the steps in the flowchart illustrated in FIG. 17 will be described with reference to FIG. 21. Here, a case in which the image sensor 102, the focal plane, and so on satisfy the following conditions will be described. The length of the long side (i.e., the side parallel to the x-axis) of the light receiving surface of the image sensor 102 is 6 mm, and the length of the short side (i.e., the side parallel to the y-axis) of the light receiving surface is 4 mm. The inclination of the focal plane relative to the x-axis is 30 degrees. The inclination of the focal plane relative to the y-axis is 0 degrees. The area of the focal plane is the same as the area of the light receiving surface of the image sensor 102. In other words, the focal plane is a rectangular plane sized 6 mm by 4 mm. One of the short sides of the focal plane lies on the yz-plane as illustrated in FIG. 21 and extends parallel to the y-axis. The other short side of the focal plane lies on the xy-plane and extends parallel to the y-axis at the position at which the x-coordinate is approximately 5.2 mm. The coordinates (x,y,z) of the center of the focal plane are (2.6,2,1.5).

Here, the assumption is that an image is selected in step S1332, the illumination position (7.5,2,10) corresponding to the image is acquired in step S1333, and the adding pixel (1.7,2,0) is selected in step S1352. In this case, the coordinates (2.6,2,1.5) of the adding point that is the point of intersection of the focal plane and the straight line passing through the adding pixel (1.7,2,0) and the illumination position (7.5,2.0,10) are calculated in step S1372. Then, in step S1382, the luminance value of the adding pixel is distributed and added to the luminance values of the pixels in the vicinity of the adding point in the focal image.

As described thus far, according to the image generating system according to the present modification, the luminance value of a first pixel in a captured image can be applied to the luminance value of one or more second pixels in a focal image that correspond to the position of a point of intersection of the focal plane and the straight line connecting the position of the first pixel and the position of the illuminator on the light receiving surface of the image sensor 102. Accordingly, the luminance value of each of the pixels in the captured image can be reflected on the luminance value of the pixel in the focal image, and a high-quality focal image of the target object can be generated.

Second Embodiment

Next, a second embodiment will be described. The second embodiment differs from the first embodiment in that the illumination position is determined adaptively in accordance with the determined focal plane and that an image of the target object is captured by using an illuminator located at the determined illumination position. Hereinafter, the second embodiment will be described with the description centered on the differences from the first embodiment.

Configuration of Image Generating System

Figure 22:
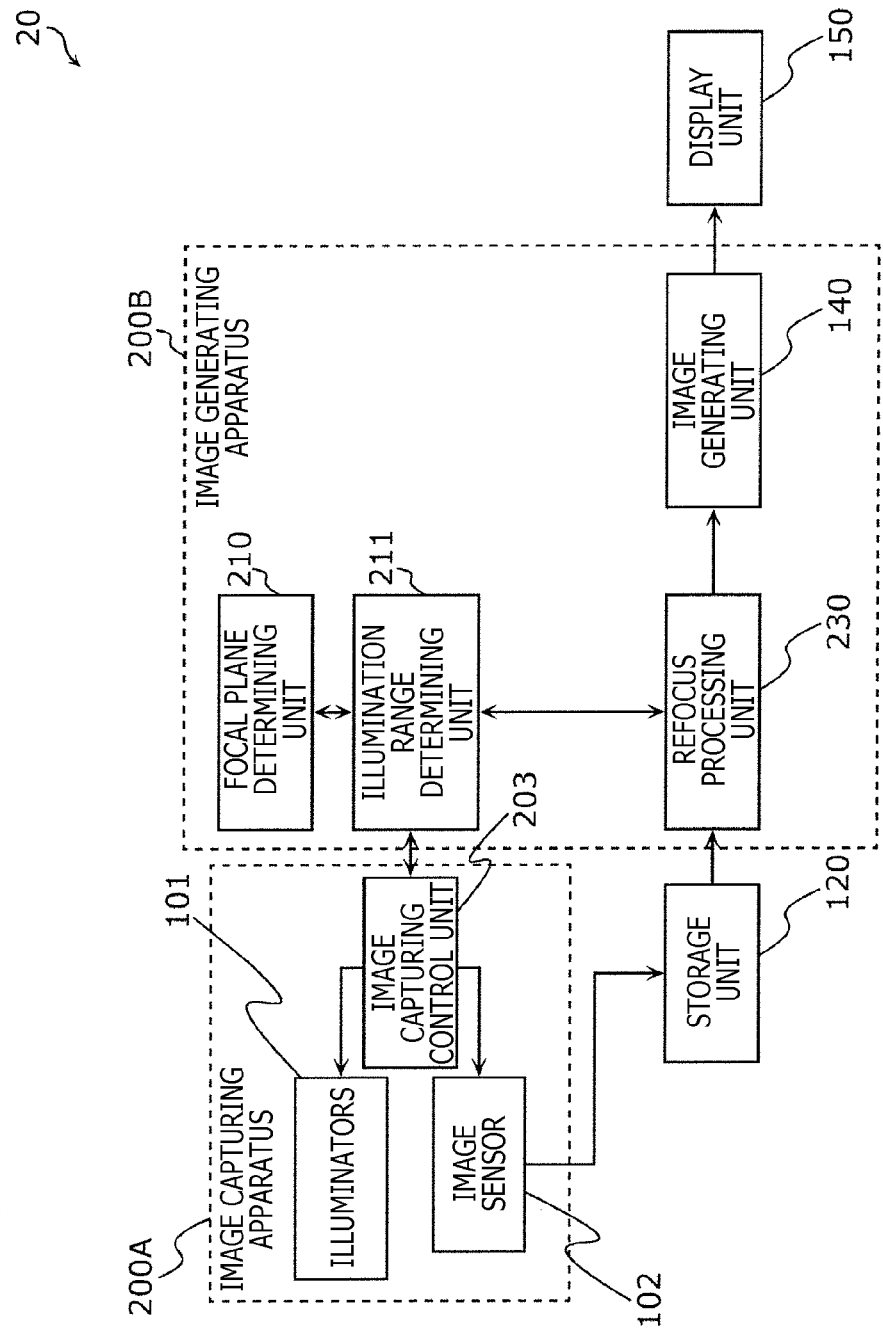
FIG. 22 is a block diagram illustrating an example of a functional configuration of an image generating system according to a second embodiment.

FIG. 22 is a block diagram illustrating a functional configuration of an image generating system 20 according to the second embodiment. In FIG. 22, constituent elements that are substantially identical to the constituent elements in FIG. 1 are given identical reference characters, and descriptions thereof will be omitted as appropriate.

The image generating system 20 includes an image capturing apparatus 200A, an image generating apparatus 200B, a storage unit 120, and a display unit 150.

Configuration of Image Capturing Apparatus

The image capturing apparatus 200A includes a plurality of illuminators 101, an image sensor 102 that records the intensity of light for each pixel, and an image capturing control unit 203.

The image capturing control unit 203 controls the operation of the plurality of illuminators 101 and of the image sensor 102 in accordance with illumination range information acquired from an illumination range determining unit 211, which will be described later. Specifically, the image capturing control unit 203 causes the plurality of illuminators 101 located at mutually different positions to sequentially emit light. Then, the image capturing control unit 203 causes the image sensor 102 to capture an image of a target object each time the target object is irradiated with light from one of the plurality of illuminators 101.

The image capturing control unit 203 may be constituted, for example, by a computer system (not illustrated) composed of a CPU, a RAM, a ROM, and so on, similarly to the image capturing control unit 103 of the first embodiment. The functions of some or all of the constituent elements of the image capturing control unit 203 may be implemented by the CPU executing a program recorded on the ROM while using the RAM as a work memory. In addition, the functions of some or all of the constituent elements of the image capturing control unit 203 may be implemented by a dedicated hardware circuit.

Configuration of Image Generating Apparatus

The image generating apparatus 200B includes a focal plane determining unit 210, the illumination range determining unit 211, a refocus processing unit 230, and an image generating unit 140.

The focal plane determining unit 210 is implemented, for example, by a control circuit or a processor and determines a virtual focal plane located between the plurality of illuminators 101 and the image sensor 102. Specifically, the focal plane determining unit 210 determines the focal plane on the basis of the information on the predefined focal plane. In addition, the focal plane determining unit 210 may, for example, determine the focal plane in accordance with information input from the outside.

The illumination range determining unit 211 determines the illumination position corresponding to the focal plane determined by the focal plane determining unit 210. Here, a specific example of determining the illumination position will be described with reference to FIGS. 23 and 24.

Figure 23:
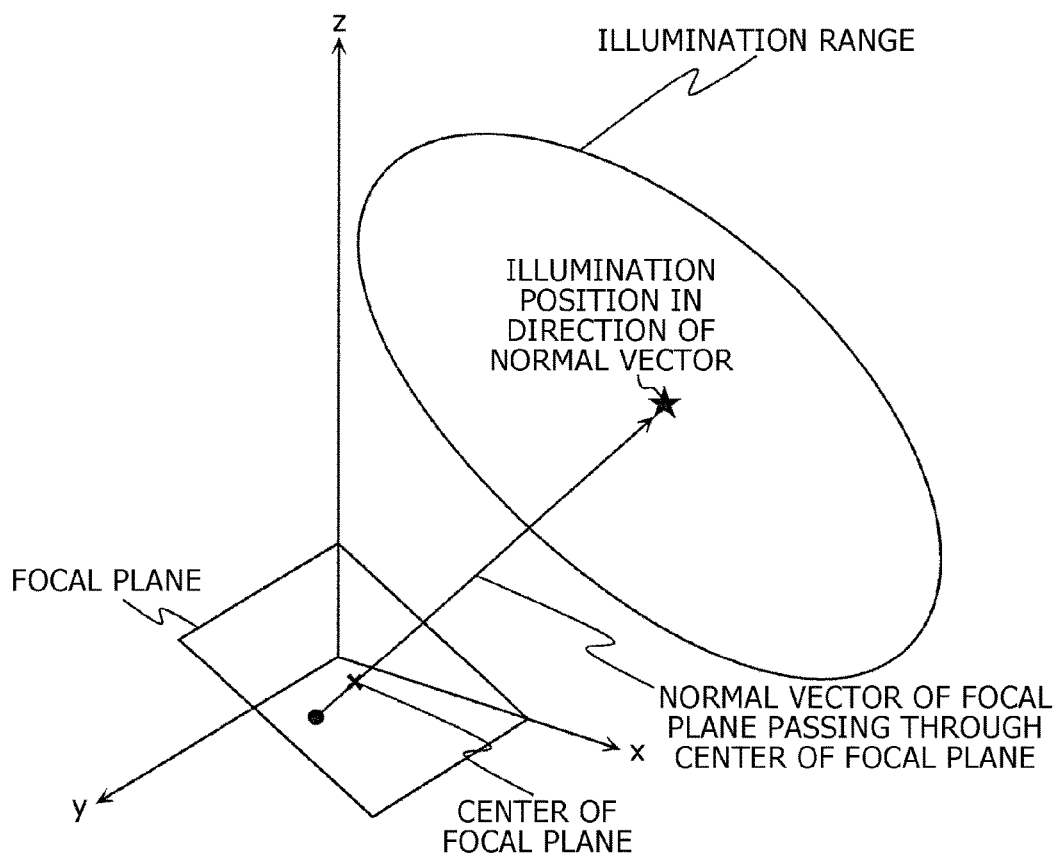
FIG. 23 schematically illustrates an example of the range for an illumination position according to the second embodiment.
Figure 24:
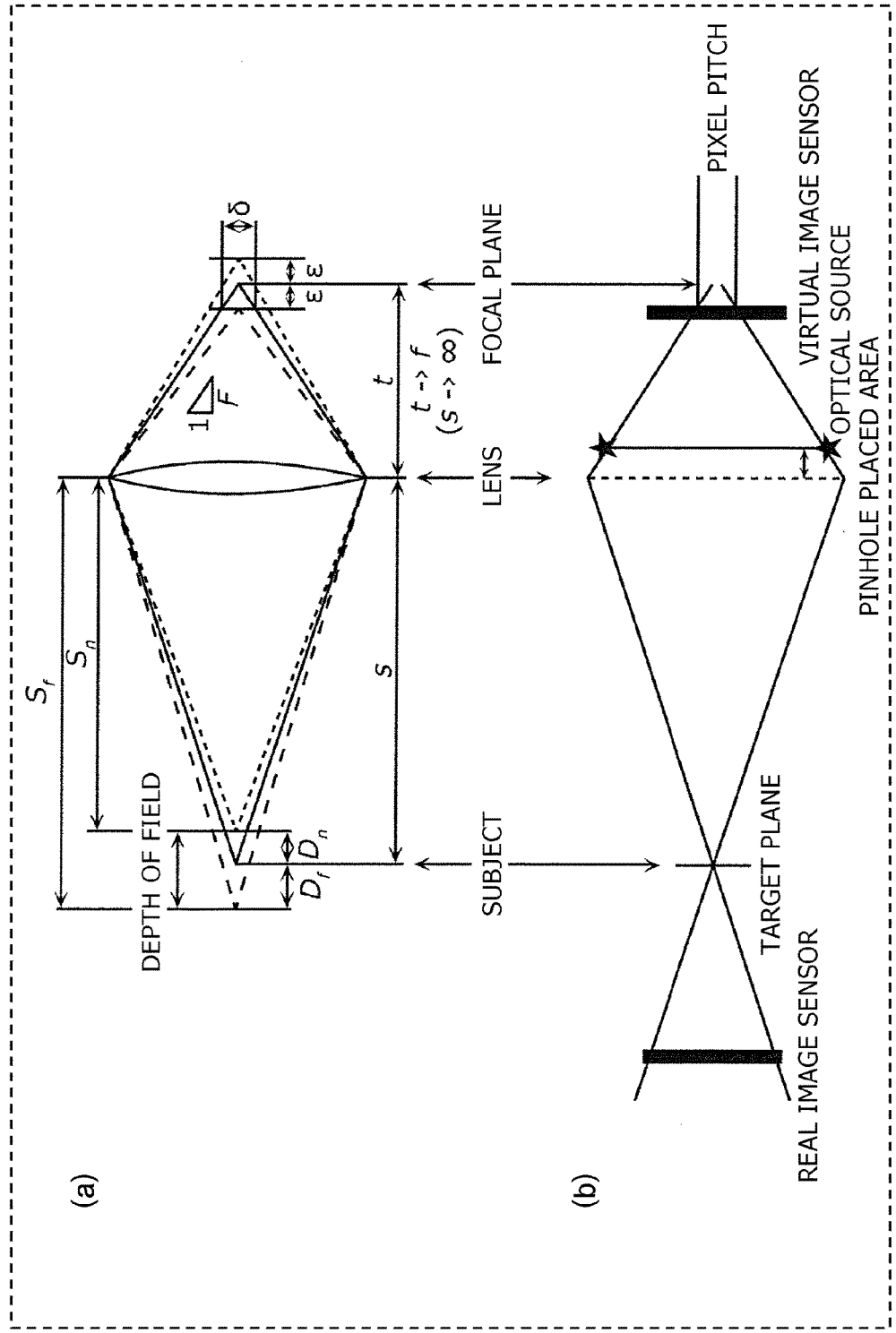
FIG. 24 is a schematic diagram illustrating the relationship between the focal length of a lens and the depth of field in association with the relationship between the arrangement of a point light source and the depth of field in refocusing.

FIG. 23 is an illustration schematically showing a method of determining the illumination position in the second embodiment. FIG. 24 is a schematic diagram illustrating the relationship between the focal length of a lens and the depth of field in association with the relationship between the arrangement of a point light source and the depth of field in refocusing. Section (a) of FIG. 24 illustrates the relationship between the focal length of the lens and the depth of field, and section (b) of FIG. 24 illustrates the relationship between the arrangement of the point light source and the depth of field in refocusing.

In FIG. 24, f represents the focal length of the lens, s represents the distance to the subject, t represents the distance from the lens to the imaging plane, F represents the F-number, ε represents ½ of the depth of focus, δ represents the diameter of the permissible circle of confusion, $s_n$ represents the near-point distance, $s_f$ represents the far-point distance, $D_n$ represent the near depth of field, and $D_f$ represents the far depth of field.

The depth of field in refocusing is determined by the size of the distribution range of the illumination positions. In section (b) of FIG. 24, the distribution range of the illumination positions indicated by the dotted line corresponds to the lens diameter in section (a) of FIG. 24. In the case of the lens illustrated in section (a) of FIG. 24, the light reflected by the surface of the subject passes through the lens and is imaged on the focal plane. The depth of field is the sum of the near depth of field $D_n$ and the far depth of field $D_f$. The present disclosure employs refocusing in capturing an image with transmitted light, and thus what corresponds to the position of the subject in section (a) of FIG. 24 is the focal plane. In section (b) of FIG. 24, the image sensor is located to the left of the focal plane. In the present embodiment, actually nothing is depicted to the right of the arrangement of the point light source in FIG. 24, but by setting the pixel pitch of the image sensor, the depth of field can be calculated as the permissible circle of confusion.

For example, the range for the illumination positions necessary for generating a focal image on the focal plane illustrated in FIG. 23 corresponds to the size of the lens disposed parallel to the focal plane as illustrated in FIG. 24. When a lens is used, the range for the illumination positions in a case in which the lens having a diameter of 10 mm disposed at a distance of 5 mm from the subject is necessary in order to observe the subject located at the focal position is expressed by the following circle. In other words, the range for the illumination positions is expressed by a circle that is parallel to the focal plane as illustrated in FIG. 23, that is at a distance of 5 mm from the focal plane, and that has a diameter of 10 mm with the center lying at the point of intersection of the normal of the focal plane that passes through the center of the focal plane and the plane parallel to the focal plane. The position of an illuminator disposed within a region obtained by mapping this range for the illumination positions onto a plane or a curved plane on which the actual point light source is disposed (e.g., the curved plane illustrated in FIG. 3 or the plane illustrated in FIG. 4) serves as an illumination position suitable for the focal plane determined by the focal plane determining unit 210.

Operation of Image Generating System

Next, the operation of the image generating system 20 configured as described above will be described.

Figure 25:
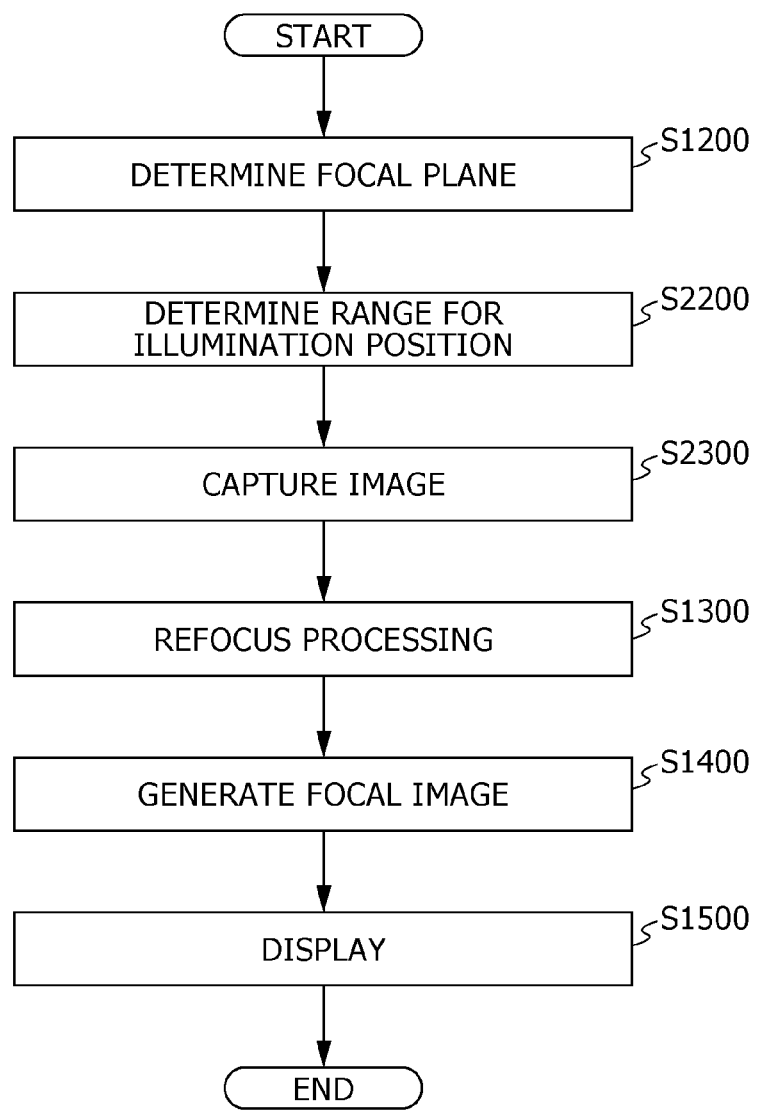
FIG. 25 is a flowchart illustrating an example of the operation of the image generating system according to the second embodiment.

FIG. 25 is a flowchart illustrating an example of the operation of the image generating system 20 according to the second embodiment. In FIG. 25, steps that are substantially identical to the steps in FIG. 7 are given identical reference numerals, and descriptions thereof will be omitted as appropriate.

As illustrated in FIG. 25, first, the focal plane determining unit 210 determines the focal plane (step S1200).

The illumination range determining unit 211 determines the range for the illumination positions that corresponds to the focal plane determined in step S1200 (step S2200).

The image capturing apparatus 200A illuminates a target object by sequentially using the illuminators, among the plurality of illuminators 101, that correspond to the range for the illumination positions determined in step S2200. Then, the image capturing apparatus 200A acquires an image of the target object by recording the intensity of the light that has reached the light receiving surface of the image sensor 102 each time an illuminator illuminates the target object. The acquired image is stored in the storage unit 120 along with the positional information of the illuminator that has illuminated the target object when the image has been captured (step S2300). Specifically, the image capturing control unit 203 of the image capturing apparatus 200A selects two or more illuminators included in the determined range for the illumination positions from the plurality of illuminators 101 on the basis of the range for the illumination positions determined in step S2200. Then, the image capturing control unit 203 causes the selected two or more illuminators to emit light in the predefined order and causes the image sensor 102 to capture an image. As the image capturing apparatus 200A repeats the illumination onto the target object and the image capturing of the target object, the images of the target object are acquired with the use of the illuminators within the determined range for the illumination positions. The operation thereafter is basically the same as that illustrated in FIG. 7 according to the first embodiment, and thus descriptions thereof will be omitted.

Advantageous Effects

As described above, according to the image generating system according to the present embodiment, the range for the illumination positions can be determined on the basis of the information on the focal plane, and the target object can be illuminated sequentially by the illuminators corresponding to the determined range for the illumination positions. Accordingly, the images of the target object can be captured by using thee illuminators suitable for generating a focal image on the focal plane, and the image capturing time can be reduced.

Modification of Second Embodiment

Next, a modification of the second embodiment will be described. The present modification differs from the second embodiment in that a target region is determined with the use of a pilot image acquired in advance, and the range for the illumination positions is determined on the basis of the target region. Hereinafter, the modification of the second embodiment will be described with the description centered on the differences from the second embodiment.

Configuration of Image Generating System

Figure 26:
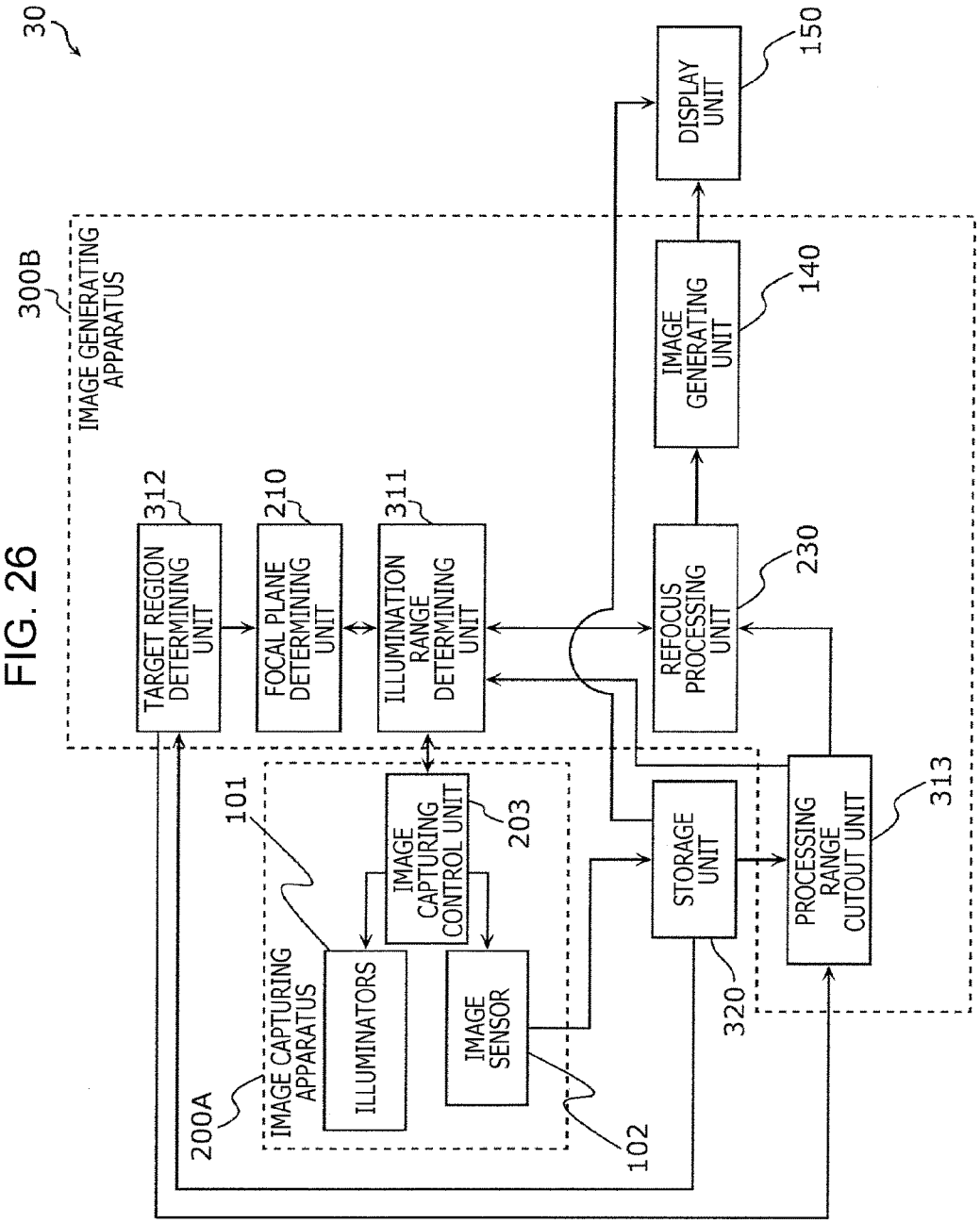
FIG. 26 is a block diagram illustrating an example of a functional configuration of an image generating system according to a modification of the second embodiment.

FIG. 26 is a block diagram illustrating a functional configuration of an image generating system 30 according to the modification of the second embodiment. In FIG. 26, constituent elements that are substantially identical to the constituent elements in FIG. 22 are given identical reference characters, and descriptions thereof will be omitted as appropriate.

The image generating system 30 includes an image capturing apparatus 200A, an image generating apparatus 300B, a storage unit 320, and a display unit 150.

The image capturing apparatus 200A includes a plurality of illuminators 101, an image sensor 102, and an image capturing control unit 203. In the present modification, the image capturing apparatus 200A acquires a pilot image by capturing an image of the target object with the use of a predefined illuminator before capturing the images of the target object by sequentially using the illuminators corresponding to the determined range for the illumination positions. The pilot image is stored in the storage unit 320 and displayed on the display unit 150. The image generating apparatus 300B includes a focal plane determining unit 210, an illumination range determining unit 311, a target region determining unit 312, a processing range cutout unit 313, a refocus processing unit 230, and an image generating unit 140.

The target region determining unit 312 determines a target region within a pilot image on the basis of a region specified by an external input or a region specified through a predefined method.

The illumination range determining unit 311 determines the range for the illumination positions on the basis of the focal plane determined by the focal plane determining unit 210 and the target region determined by the target region determining unit 312.

The storage unit 320 stores an image captured by the image sensor 102 along with the positional information of the illuminator used to capture that image. Furthermore, the storage unit 320 stores an image captured when the target image is illuminated with a predefined illuminator as a pilot image. This pilot image is output to the target region determining unit 312.

The processing range cutout unit 313 cuts out a region corresponding to the target region determined by the target region determining unit 312 from each of the plurality of images stored in the storage unit 320. Then, the processing range cutout unit 313 outputs the cutout images to the refocus processing unit 230 along with the illumination position information.

Operation of Image Generating System

Next, the operation of the image generating system 30 configured as described above will be described.

Figure 27:
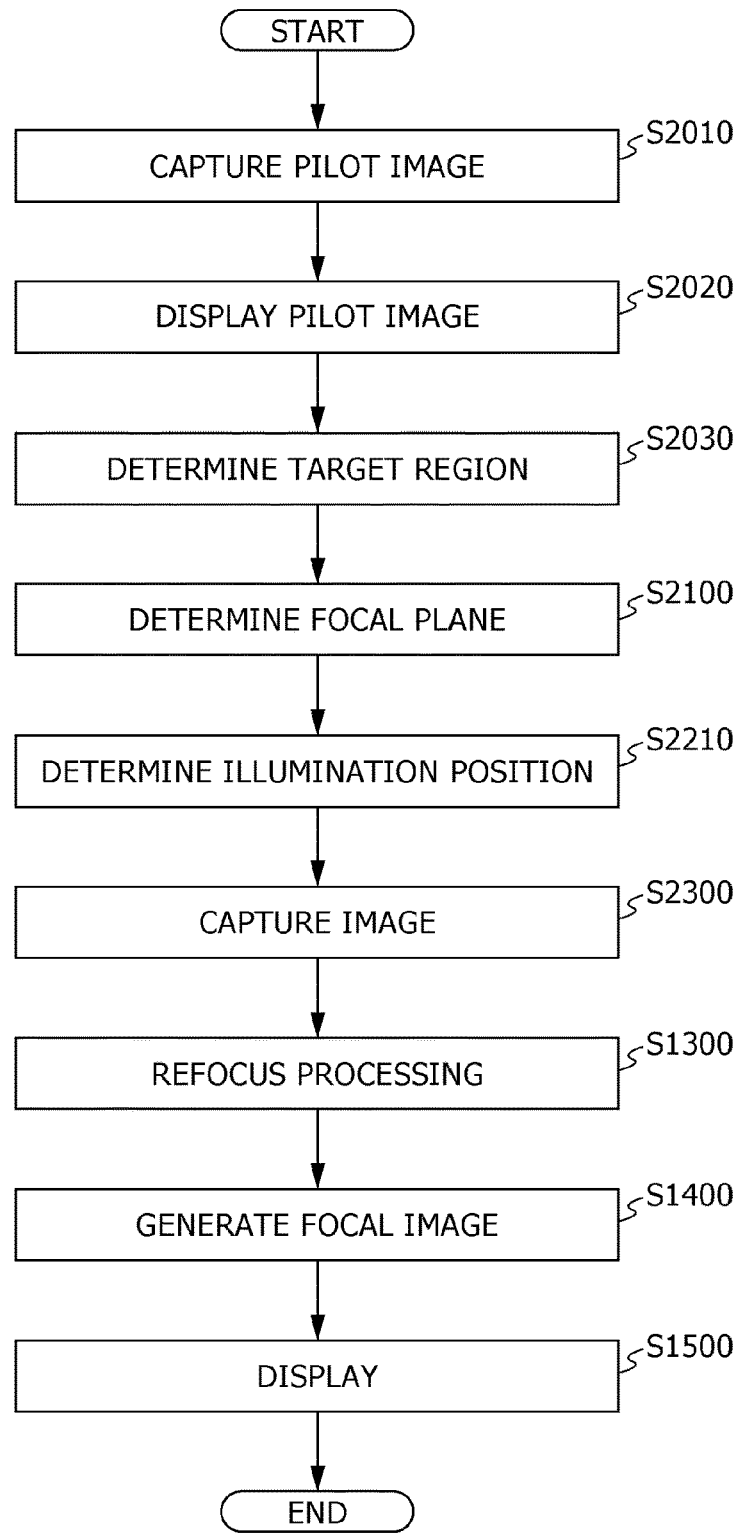
FIG. 27 is a flowchart illustrating an example of the operation of the image generating system according to the modification of the second embodiment.

FIG. 27 is a flowchart illustrating an example of the operation of the image generating system 30. As illustrated in FIG. 27, first, the image capturing control unit 203 of the image capturing apparatus 200A acquires a pilot image by illuminating a target object with the use of an illuminator located at the position of the predefined illuminator (e.g., coordinates (0,0)) and detecting the intensity of the light that has reached the light receiving surface of the image sensor 102. The pilot image is stored in the storage unit 320 (step S2010). The storage unit 320 outputs the pilot image captured in step S2010 to the display unit 150, and the display unit 150 displays the pilot image (step S2020).

The user specifies a region in which a focal image is to be generated within the pilot image displayed in step S2020. The target region determining unit 312 determines the target region on the basis of the region specified by the user (step S2030).

In the present modification, the pilot image is displayed, and an input specifying a region within the pilot image is received from the user, but this is not a limiting example. For example, the target region determining unit 312 may carry out recognition processing of the target object in the pilot image, and the target region may be determined on the basis of the recognition result. The recognition processing of the target object is carried out, for example, on the basis of a predefined feature, such as the color or the outline. In a case in which a plurality of regions have been extracted through the recognition processing of the target object, the target region determining unit 312 may select at least one of the plurality of extracted regions as the target region or may determine all of the plurality of extracted regions to be the target regions, on the basis of the position of the region within the image, for example.

The focal plane determining unit 210 determines the focal plane (step S2100). The illumination range determining unit 311 determines the range for the illumination positions on the basis of the target region determined in step S2030 and the focal plane determined in step S2100 (step S2210). Specifically, the illumination range determining unit 311 determines the range for the illumination positions with the use of the center of the target region, instead of the center of the focal plane as in FIG. 23. The steps thereafter are substantially identical to those in FIG. 18, and thus descriptions thereof will be omitted.

Advantageous Effects

As described above, according to the image generating system 30 according to the present modification, the range for the illumination positions can be determined on the basis of the focal plane as well as the target region, and the image capturing time can be further reduced.

Third Embodiment

Next, a third embodiment will be described. The third embodiment differs from the first embodiment in that the focal plane is determined on the basis of the state of the target object. For example, in the present embodiment, in a case in which the state of a target object changes in accordance with the culture time, as in the case of a fertilized ovum or an early embryo, the number of focal planes and the angle of a focal plane are determined on the basis of the state of the target object corresponding to the culture time. Hereinafter, the third embodiment will be described with the description centered on the differences from the first embodiment.

Configuration of Image Generating System

Figure 28:
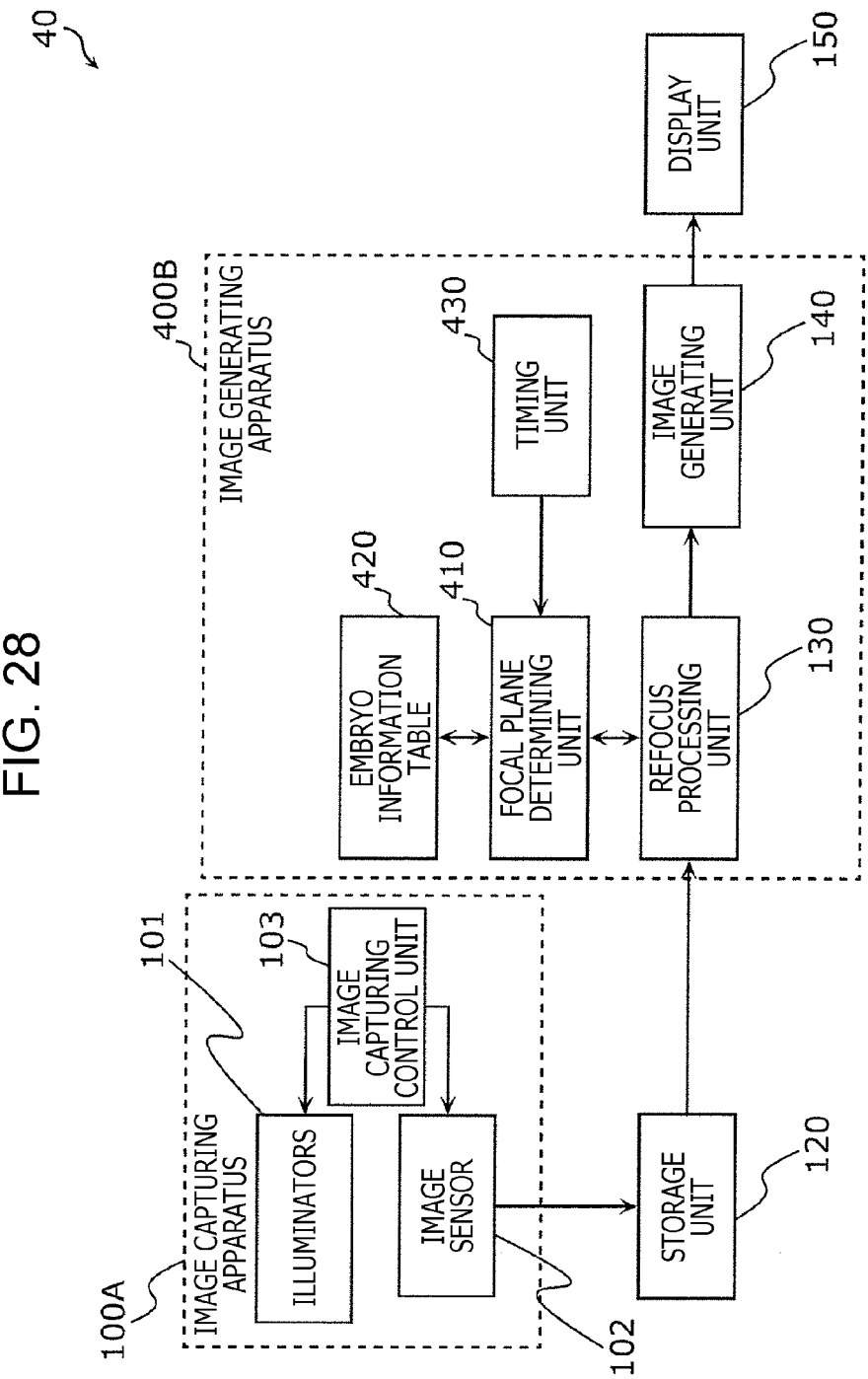
FIG. 28 is a block diagram illustrating an example of a functional configuration of an image generating system according to a third embodiment.

FIG. 28 is a block diagram illustrating a functional configuration of an image generating system 40 according to the third embodiment. In FIG. 28, constituent elements that are substantially identical to the constituent elements in FIG. 1 are given identical reference characters, and descriptions thereof will be omitted as appropriate.

The image generating system 40 includes an image capturing apparatus 100A, an image generating apparatus 400B, a storage unit 120, and a display unit 150. The image generating apparatus 400B includes a focal plane determining unit 410, an embryo information table 420, a timing unit 430, a refocus processing unit 130, and an image generating unit 140.

Figures 29, 30:
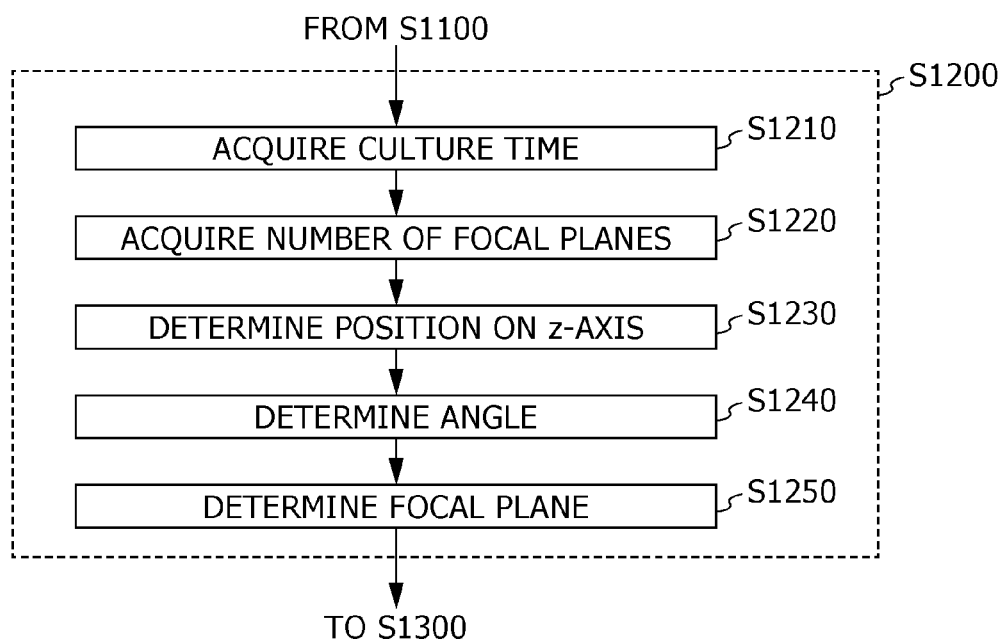
FIG. 29 illustrates an example of an embryo information table according to the third embodiment.
FIG. 30 is a flowchart illustrating an example of the operation of a focal plane determining unit according to the third embodiment.

In the embryo information table 420, the culture time and the information on the state of the embryo and the focal plane corresponding to the culture time are recorded. FIG. 29 illustrates an example of the embryo information table 420. In the example illustrated in FIG. 29, the state of the embryo and the number of focal planes for each culture time are recorded in the embryo information table 420.

The timing unit 430 measures the elapsed time from the time at which the target object starts being cultured (i.e., the culture time).

The focal plane determining unit 410 acquires, from the embryo information table 420, the number of focal planes corresponding to the culture time measured by the timing unit 430. Then, the focal plane determining unit 410 determines the focal planes in the number equal to the acquired number between the image sensor 102 and the plurality of illuminators 101. Specifically, the focal plane determining unit 410 determines the focal planes inclined at an externally input angle or at a predefined angle in the number obtained from the embryo information table 420. In a case in which the target object is an early embryo, for example, a plurality of focal planes parallel to each other are determined. The size of an early embryo is approximately 100 µm, and thus the distance between the focal planes is determined such that the height of 100 µm is equally divided by the focal planes in the number equal to the number obtained from the embryo information table 420. For example, when the number of focal planes is two, the distance between the two focal planes is determined to be 33 µm.

Operation of Image Generating System

Next, the operation of the image generating system 40 configured as described above will be described.

The operation of the image generating system 40 is substantially identical to that of FIG. 7 according to the first embodiment except in the operation of determining the focal plane in step S1200. Thus, only the details of step S1200 will be described, and the descriptions of the other operations will be omitted.

FIG. 30 is a flowchart illustrating an example of the operation of the focal plane determining unit 410 according to the third embodiment.

First, the focal plane determining unit 410 acquires the culture time from the timing unit 430 (step S1210). Subsequently, the focal plane determining unit 410 acquires the number of focal planes corresponding to the culture time acquired in step S1210 by referring to the embryo information table 420 (step S1220). The focal plane determining unit 410 determines the height of the center of each focal plane (i.e., the z-coordinate value in the xyz-space defined as in FIG. 8) on the basis of the number of focal planes acquired in step S1220 (step S1230). In the present embodiment, when a focal image on each of the plurality of focal planes is to be generated, all of the focal planes are disposed parallel to each other to facilitate understanding of the user. It is to be noted that the angles and the arrangement of the plurality of focal planes are not limited to the above.

Furthermore, the focal plane determining unit 410 determines the angle of the focal plane relative to the x-axis and the angle of the focal plane relative to the y-axis on the basis of the information on the inclination of the focal plane input through an input device (not illustrated) or the information on the inclination of the predefined focal plane (step S1240). Each of the focal planes is disposed virtually at an angle determined in step S1240 with the center position of the focal plane determined in step S1230 being the center of rotation, and thus the focal plane is determined (step S1250).

Advantageous Effects

As described above, according to the image generating system 40 according to the present embodiment, the number of focal planes can be determined in accordance with the state of the target object, and a focal image suitable for observing the target object can be generated.

Modification of Third Embodiment

A modification of the third embodiment differs from the above-described third embodiment in that a focal image is generated on a focal plane parallel to the light receiving surface of the image sensor first and another focal plane is determined automatically in accordance with the three-dimensional arrangement of a target object (e.g., cell) in the generated focal image. Hereinafter, the modification of the third embodiment will be described with the description centered on the differences from the third embodiment.

Figure 31:
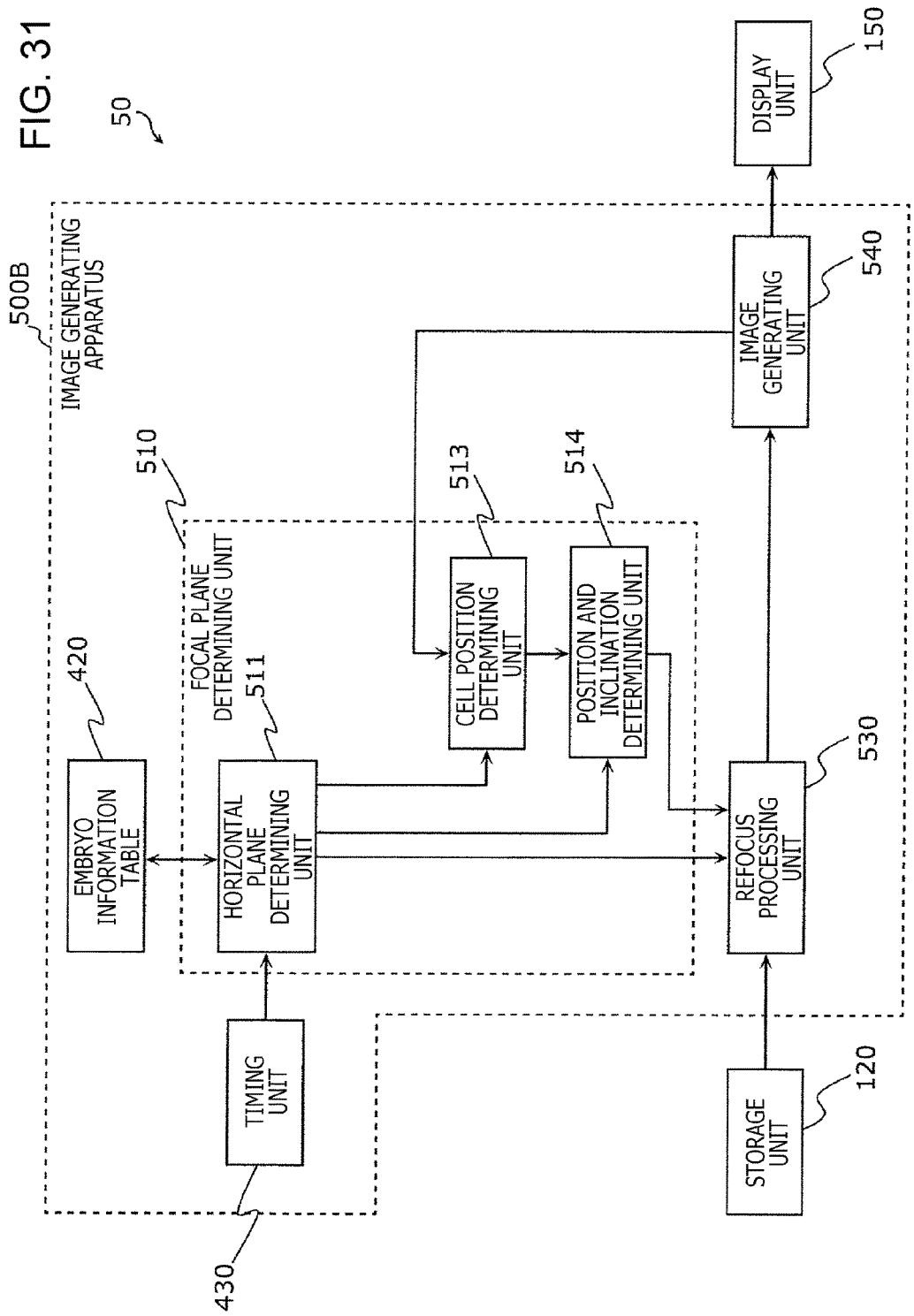
FIG. 31 is a block diagram illustrating an example of a functional configuration of an image generating system according to a modification of the third embodiment.

FIG. 31 is a block diagram illustrating a functional configuration of an image generating system 50 according to the modification of the third embodiment. In FIG. 31, an image capturing apparatus 100A is the same as that illustrated in FIG. 28 and is thus not depicted in FIG. 31. In addition, in FIG. 31, constituent elements that are substantially identical to the constituent elements in FIG. 28 are given identical reference characters, and descriptions thereof will be omitted as appropriate.

An image generating apparatus 500B includes a focal plane determining unit 510, an embryo information table 420, a timing unit 430, a refocus processing unit 530, and an image generating unit 540. The focal plane determining unit 510 includes a horizontal plane determining unit 511, a cell position determining unit 513, and a position and inclination determining unit 514.

The horizontal plane determining unit 511 determines the number of focal planes corresponding to the culture time acquired from the timing unit 430 by referring to the embryo information table 420. The horizontal plane determining unit 511 determines the number of horizontal planes parallel to the light receiving surface of the image sensor 102 and the positions of the horizontal planes on the z-axis that are to be used to determine the position and the inclination of the focal plane on the basis of the determined number of focal planes.

The cell position determining unit 513 compares the focal image on the horizontal plane parallel to the light receiving surface generated by the image generating unit 540 with a sectional image generated from a three-dimensional model and determines the arrangement of the cell on the three-dimensional coordinates on the basis of the comparison result.

Here, the detailed configuration of the cell position determining unit 513 will be described with reference to FIG. 32.

Figure 32:
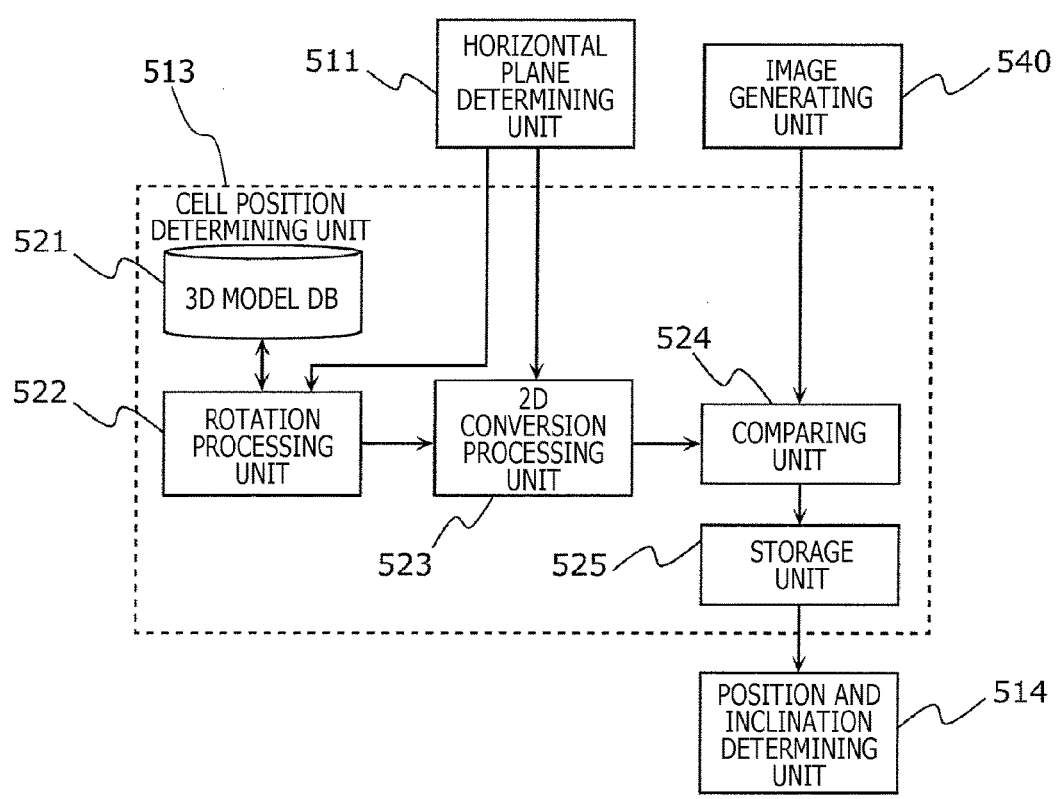
FIG. 32 is a block diagram illustrating an example of a detailed functional configuration of a cell position determining unit according to the modification of the third embodiment.

FIG. 32 is a block diagram illustrating a detailed functional configuration of the cell position determining unit 513. The cell position determining unit 513 includes a 3D model database (DB) 521, a rotation processing unit 522, a 2D conversion processing unit 523, a comparing unit 524, and a storage unit 525.

The 3D model database 521 stores the state of a target object (here, a three-dimensional model in each cell stage of an early embryo). The three-dimensional model of an early embryo shows a state in which substantially spherical cells are enclosed within a spherical embryonic membrane in the number corresponding to the cell stage.

The rotation processing unit 522 rotates the three-dimensional model stored in the 3D model database 521 at a predefined angle.

The 2D conversion processing unit 523 generates a sectional image along a horizontal plane determined by the horizontal plane determining unit 511 with the use of the three-dimensional model rotated by the rotation processing unit 522.

The comparing unit 524 compares the focal image on the horizontal plane generated by the image generating unit 540 with the sectional image generated from the three-dimensional model by the 2D conversion processing unit 523. This comparison is repeated while changing the angle of rotation of the rotation processing unit 522. As a result, an angle of rotation at which a value indicating a difference between the focal image and the sectional image falls below a predefined threshold value is obtained.

The storage unit 525 stores the angle of rotation of the rotation processing unit 522 at which the value indicating the difference between the two images compared by the comparing unit 524 falls below the threshold value.

The position and inclination determining unit 514 determines the position of the center point of each focal plane on the z-axis and the values of inclination of each focal plane relative to the x-axis and the y-axis on the basis of the arrangement of the cells on the three-dimensional coordinates determined by the cell position determining unit 513 and the number of focal planes determined by the horizontal plane determining unit 511.

The refocus processing unit 530 carries out refocus processing on the plane determined by the horizontal plane determining unit 511 or on the focal plane determined by the position and inclination determining unit 514 on the basis of the plurality of images captured by the image capturing apparatus 100A.

The image generating unit 540 generates a focal image by using the luminance value of each pixel generated by the refocus processing unit 530.

Operation of Image Generating System

Next, the operation of the image generating system 50 configured as described above will be described.

The operation of the image generating system 50 is substantially identical to that of FIG. 7 according to the first embodiment except in step S1200. Thus, only the details of step S1200 will be described, and the descriptions of the other operations will be omitted.

Figure 33:
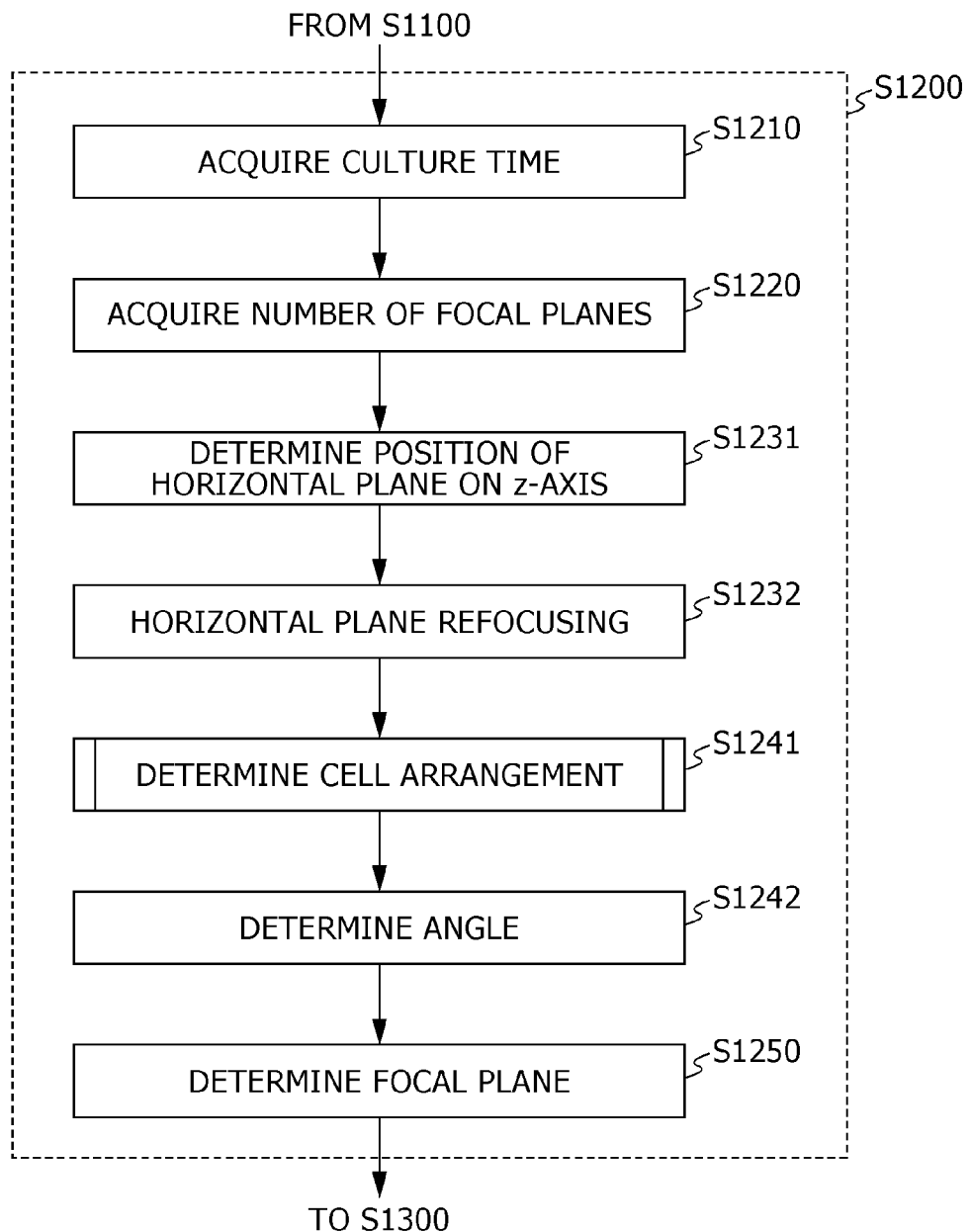
FIG. 33 is a flowchart illustrating an example of the operation of a focal plane determining unit according to the modification of the third embodiment.

FIG. 33 is a flowchart illustrating an example of the operation of the focal plane determining unit 510 according to the modification of the third embodiment.

First, the horizontal plane determining unit 511 of the focal plane determining unit 510 acquires the culture time from the timing unit 430 (step S1210). Subsequently, the horizontal plane determining unit 511 acquires the number of focal planes corresponding to the culture time acquired in step S1210 by referring to the embryo information table 420 (step S1220). The horizontal plane determining unit 511 determines the position on the z-axis of each of the horizontal planes that are in the number equal to the number of focal planes acquired in step S1220 (step S1231). In the present modification, a plurality of sectional images generated from a three-dimensional model are compared with focal images on a plurality of horizontal planes, and thus the angle of the focal plane for the focal image to be output from the image generating system 50 is determined. In the embryo information table illustrated in FIG. 29, 1 is recorded as the number of focal planes for the pronuclear stage embryo and the two-sell stage embryo. Thus, in step S1231, the position on the z-axis of the horizontal planes that are in the number equal to the number of focal planes obtained by referring to the embryo information table 420 is determined.

It is to be noted that the number of horizontal planes does not have to match the number of focal planes. In this case, in addition to the number of focal planes, the number of horizontal planes for determining the arrangement of the cells may be recorded in the embryo information table 420. In addition, as in the modification of the second embodiment, a pilot image may be acquired, and the number of horizontal planes may be determined on the basis of the state of the pilot image.

The size of an early embryo is approximately 100 µm in diameter, and thus the position of the horizontal plane on the z-axis is determined, for example, such that the height of 100 µm is equally divided by the horizontal planes that are in the number equal to the number obtained from the embryo information table 420. An embryo is at the bottom in the culture fluid and is thus in contact with the light receiving surface of the image sensor 102. Therefore, when the number of horizontal planes is two, for example, the positions of the two horizontal planes on the z-axis are 33 µm and 66 µm.

The refocus processing unit 530 carries out the refocus processing on the horizontal plane at the position on the z-axis determined in step S1231. The image generating unit 540 generates a focal image by using the luminance value of each pixel calculated by the refocus processing unit 530 (step S1232).

The cell position determining unit 513 determines the arrangement of the cells and the angle of rotation of the early embryo from the arrangement of the cells (hereinafter, referred to as the reference position) suitable for observing the early embryo by comparing the focal image generated in step S1232 with the sectional image generated from the three-dimensional model of the early embryo (step S1241). Details of step S1241 will be described later.

The position and inclination determining unit 514 determines the angle of the focal plane so that the focal plane matches the horizontal plane at the reference position on the basis of the arrangement of the cells and the angle of rotation determined in step S1241 (step S1242). For example, the angle of a plane obtained by rotating the horizontal plane at the coordinates held when the image is captured at the angle of rotation in a reverse direction of the angle of rotation determined in step S1241 is determined as the angle of the focal plane.

Subsequently, the position and inclination determining unit 514 determines the position on the z-axis of the focal planes that are in the number equal to the number acquired by the horizontal plane determining unit 511 in step S1220. The position on the z-axis is determined, for example, such that the entire size of the target object in the direction of the z-axis is equally divided.

The position and inclination determining unit 514 determines all of the focal planes by using the angle and the position on the z-axis determined in step S1242 (step S1250).

In the present modification, the description is based on the assumption that all of the focal planes are parallel to each other, but the focal planes may be disposed at different angles. For example, a plurality of focal planes may be disposed in a point-symmetric manner with their centers lying at a given coordinate point. The center point of an embryo on the light receiving surface of the image sensor may be determined on the basis of the result of capturing an image from a point immediately above the image sensor, and since the diameter of an embryo is approximately 100 µm, the focal plane may be disposed with the position at a height of 50 µm in the direction of the z-axis from the center point of the embryo on the light receiving surface of the image sensor used as the center of rotation.

Next, details of step S1241 of FIG. 33 will be described with reference to FIG. 34. FIG. 34 is a flowchart illustrating the processing pertaining to the determination of the cell arrangement by the focal plane determining unit 510 according to the modification of the third embodiment.

The rotation processing unit 522 of the cell position determining unit 513 acquires information on the state of the early embryo, the number of horizontal planes, and the position of the horizontal plane on the z-axis from the horizontal plane determining unit 511 (step S12411). The rotation processing unit 522 determines whether the comparing processing has been carried out on all of the three-dimensional models, among the models stored in the 3D model database 521, that correspond to the information on the state of the embryo acquired in step S12411 (step S12412). The comparing processing refers to the processing in steps S12413 through S12418.

Here, if the comparing processing has been carried out on all of the three-dimensional models that correspond to the information on the state of the embryo (yes in step S12412), the processing proceeds to step S1242. Meanwhile, if there is a three-dimensional model, among the three-dimensional models that correspond to the information on the state of the embryo, on which the comparing processing has not been carried out (no in step S12412), the processing proceeds to step S12413.

One of the three-dimensional models that correspond to the information on the state of the embryo acquired in step S12411 is selected (step S12413). The three-dimensional model selected here is one on which the comparing processing has not been carried out.

The three-dimensional model three-dimensionally expresses the arrangement of the cells in an embryo for each state of the embryo. The three-dimensional model is retained in a rotatable state, and the reference position at which the three-dimensional model is not rotated is set such that the section of the cells along a plane parallel to the xy-plane, or in other words, parallel to the light receiving surface is the section most suitable for observing the cells. FIGS. 35A through 35D illustrate an example of a three-dimensional model of a four-cell stage embryo. In the three-dimensional model illustrated in FIGS. 35A through 35D, two cells (a first cell 3501 and a second cell 3502) are arrayed at a low position in the direction of the z-axis, and two cells (a third cell 3503 and a fourth cell 3504) are arrayed at a high position. The straight line connecting the center point of the first cell 3501 and the center point of the second cell 3502 and the straight line connecting the center point of the third cell 3503 and the center point of the fourth cell 3504 are orthogonal to each other when mapped onto the xy-plane. When the three-dimensional model is seen from the above, it looks like FIG. 35D.

Figure 35A:
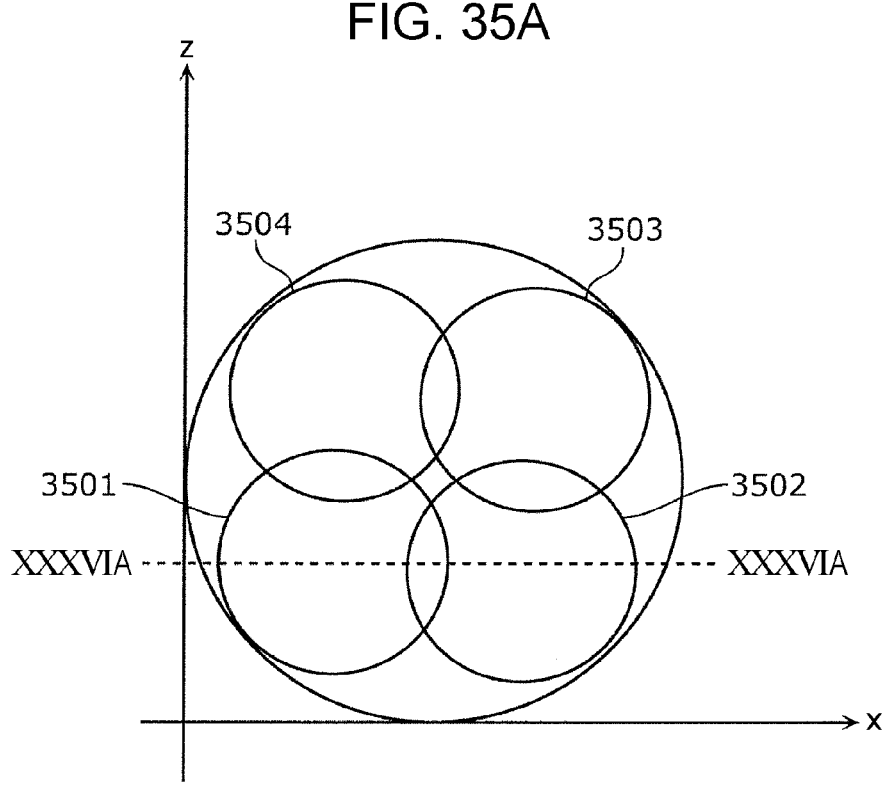
FIG. 35A is a side view of a three-dimensional model of a four-cell stage embryo.
Figure 35B:
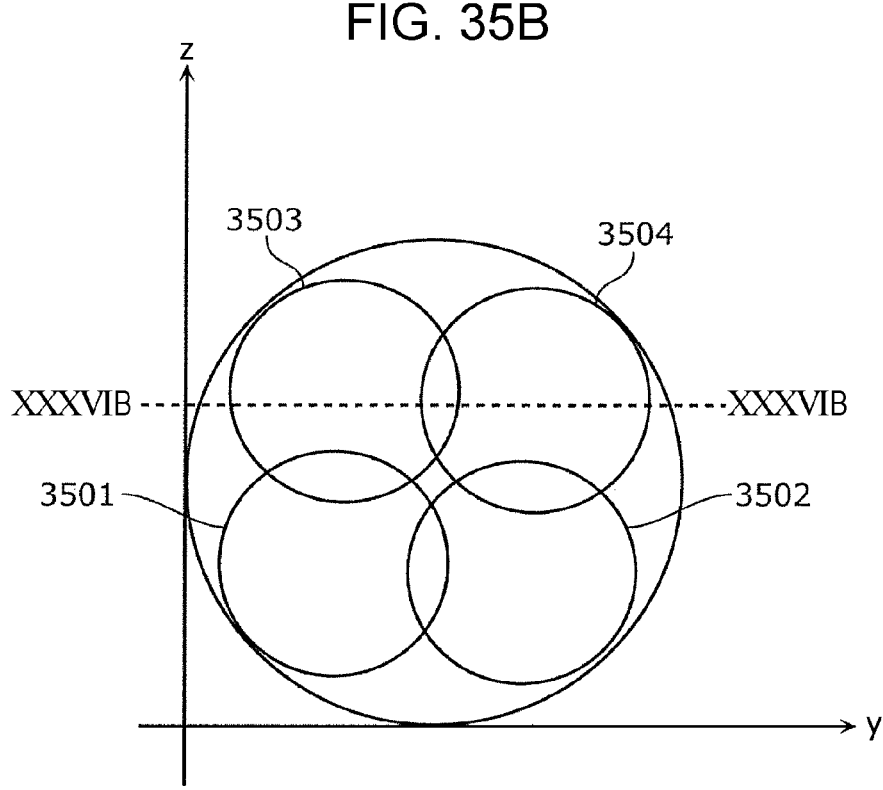
FIG. 35B is a side view of the three-dimensional model of the four-cell stage embryo.
Figure 35C:
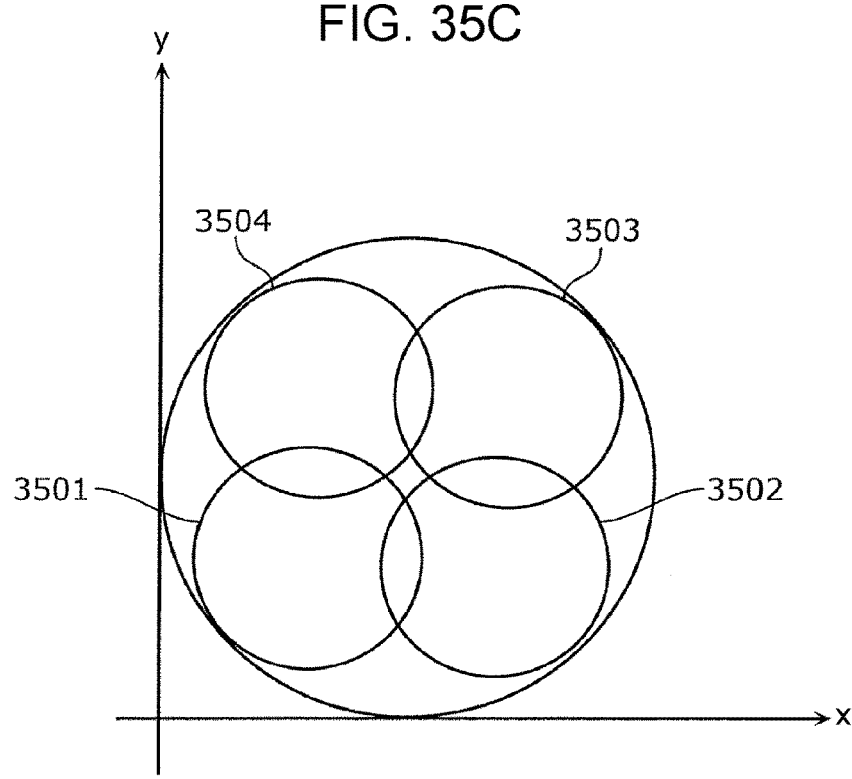
FIG. 35C is a plan view of the three-dimensional model of the four-cell stage embryo.
Figure 35D:
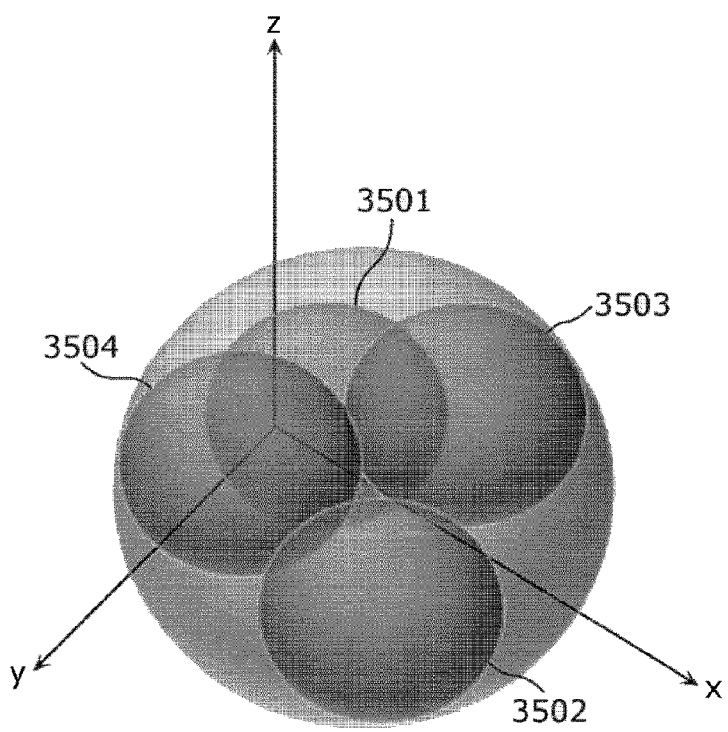
FIG. 35D is a perspective view of the three-dimensional model of the four-cell stage embryo.
Figure 36A:
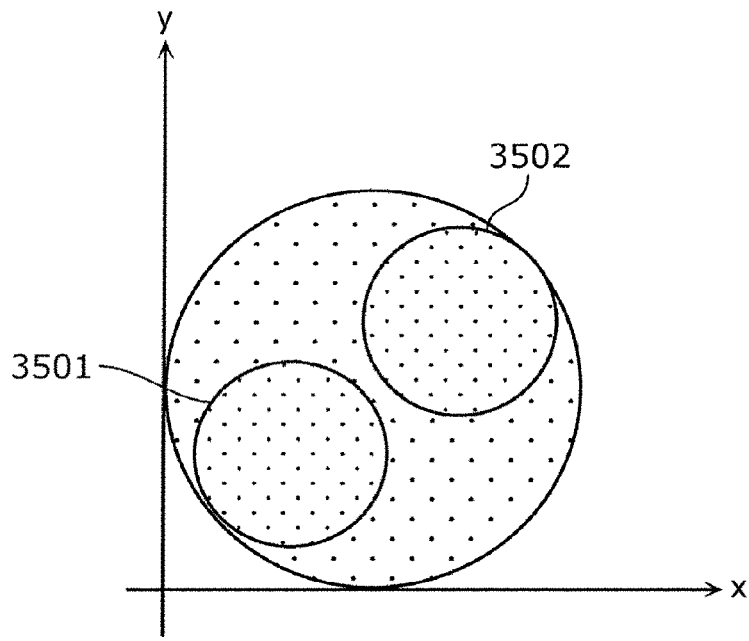
FIG. 36A is a sectional view of the three-dimensional model of the four-cell stage embryo.
Figure 36B:
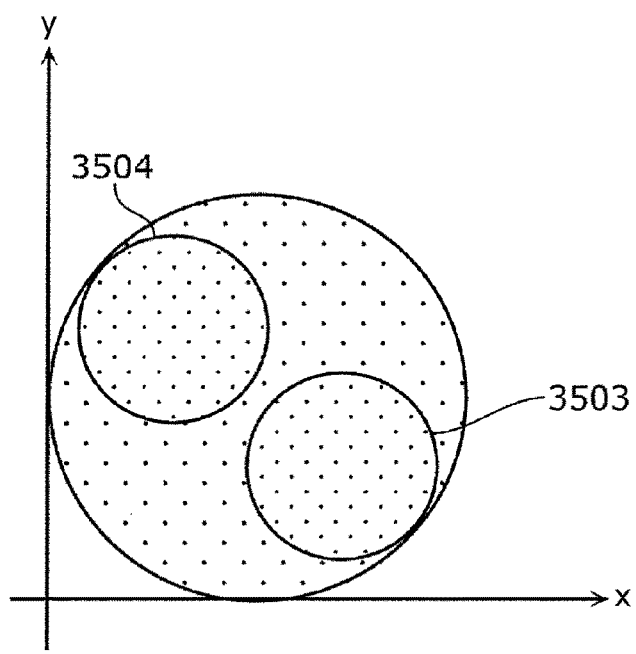
FIG. 36B is a sectional view of the three-dimensional model of the four-cell stage embryo.

FIGS. 36A and 36B are sectional views of the three-dimensional model taken along the line XXXVIA of FIG. 35A and the line XXXVIB of FIG. 35B. Two pairs of the cells arrayed on the plane parallel to the xy-plane are stacked in two layers in the direction of the z-axis. In this example, the straight line connecting the center point of the first cell 3501 and the center point of the second cell 3502 and the straight line connecting the center point of the third cell 3503 and the center point of the fourth cell 3504 are in torsion. FIGS. 35A through 36B illustrate the three-dimensional model in the reference position. In other words, the position where the first cell 3501 and the second cell 3502 are arrayed on a plane parallel to the xy-plane and the third cell 3503 and the fourth cell 3504 are arrayed on another plane parallel to the xy-plane is the reference position.

Next, the rotation processing unit 522 determines whether the sectional image of the three-dimensional model selected in step S12413 has been compared with the focal image on the horizontal plane generated in step S1232 at all of the predefined angles of rotation (step S12414). Here, if the comparison has been carried out at all of the angles of rotation (yes in step S12414), the processing returns to step S12412. Meanwhile, if there is any predefined angle of rotation at which the comparison has not been carried out (no in step S12414), the processing proceeds to step S12415.

The rotation processing unit 522 rotates the three-dimensional model selected in step S12413 at the angle of rotation, among the predefined angles of rotation, at which the comparing processing has not been carried out (step S12415).

Figure 37:
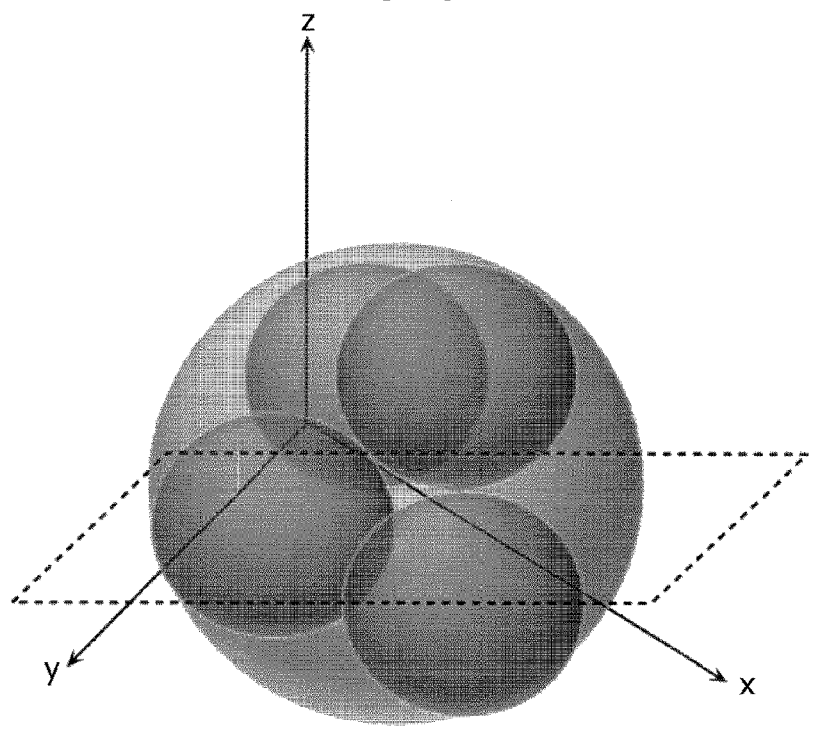
FIG. 37 is a perspective view of the three-dimensional model of the four-cell stage embryo.
Figure 38:
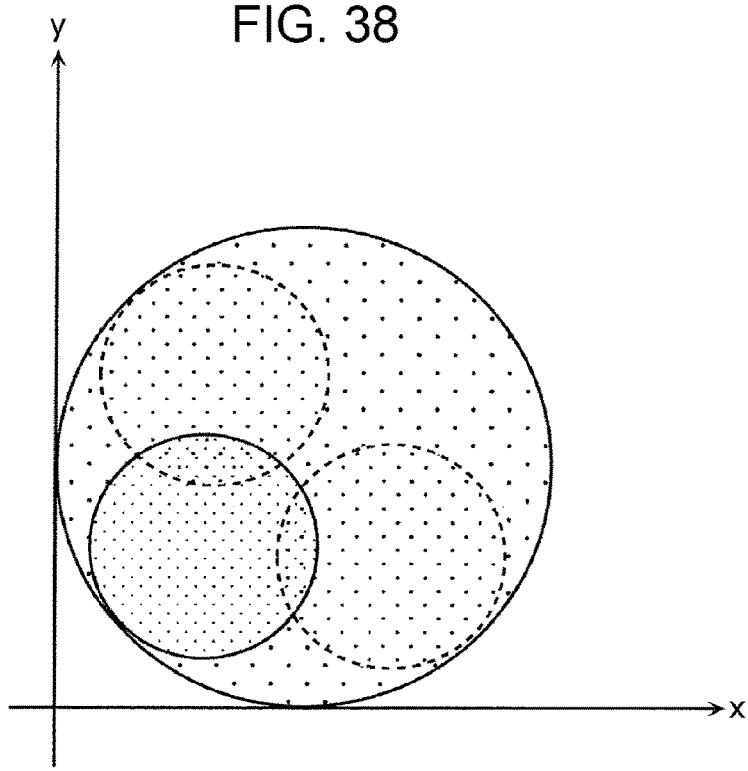
FIG. 38 is a sectional view of the three-dimensional model of the four-cell stage embryo.

The 2D conversion processing unit 523 generates a sectional image of the three-dimensional model rotated in step S12415 along the one or more planes determined in step S1231 (step S12416). FIG. 37 is a perspective view of the three-dimensional model illustrating the result of rotating the three-dimensional model in the reference position illustrated in FIG. 35D about the axis parallel to the x-axis and passing through the center of the embryo. The sectional image is generated along the plane indicated by the dashed line in FIG. 37. As illustrated in FIG. 38, in the sectional image, the outline of the cell at the lower left is clear, the cell located at the highest position on the z-axis does not appear, and the outlines of the two cells in the middle are blurred. The 2D conversion processing unit 523 generates a sectional image of the rotated three-dimensional model on the basis of the specified plane and the depth of field. The depth of field used here is equal to the depth of field of the image generating system 50.

The comparing unit 524 compares the focal image along the horizontal plane generated in step S1232 with the sectional image generated in step S12416 and determines whether the value indicating the difference between the two is smaller than the value stored in the storage unit 525 (step S12417). Here, if the value indicating the difference is no smaller than the value stored in the storage unit 525 (no in step S12417), the processing returns to step S12414. Meanwhile, if the value indicating the difference is smaller than the value stored in the storage unit 525 (yes in step S12417), the processing proceeds to step S12418. As the initial value, for example, an upper limit value for the value indicating the difference is stored in advance in the storage unit 525.

The storage unit 525 stores the value indicating the difference between the focal image and the sectional image and the angle of rotation used to rotate the three-dimensional model in step S12415 (step S12418). In other words, the value stored in the storage unit 525 is updated to the value indicating the difference between the focal image along the horizontal plane generated in step S1232 and the sectional image generated in step S12416. Thereafter, the processing returns to step S12414.

By repeating the comparing processing in steps S12414 through S12418, it becomes possible to find by how much the three-dimensional model has been rotated from the reference position to have a sectional image that is close to the focal image generated in step S1232 (i.e., the focal image along the horizontal plane generated from the captured image).

Advantageous Effects

As described above, according to the image generating system 50 according to the present modification, the position and the angle of the focal plane can be determined in accordance with the arrangement of the cells in an early embryo serving as a target object. Therefore, a focal image suitable for observing the early embryo can be generated.

Other Embodiments

Thus far, image generating systems according to one or a plurality of aspects have been described on the basis of the embodiments, but the present disclosure is not limited to these embodiments. Unless departing from the spirit of the present disclosure, an embodiment obtained by making various modifications to the present embodiments that are conceivable by a person skilled in the art or an embodiment obtained by combining the constituent elements in different embodiments may also be included within the scope of one or a plurality of aspects.

It is to be noted that, although the timing unit 430 measures the elapsed time from the start of the culture as the culture time in the above-described third embodiment and the modification thereof, the elapsed time after fertilization may be measured. In this case, the embryo information table may hold the information on the elapsed time from fertilization, instead of the culture time.

The present disclosure can be widely used in an apparatus that generates an image of a cell in culture or a cell block such as an embryo and is effectively used when an image of a target object is captured in an incubator.

What is claimed is:

1. An image generating system, comprising:
    a plurality of illuminators;
    an image sensor on which a target object is to be placed; and
    at least one control circuit,
    wherein the image generating system generates a focal image of the target object on a virtual focal plane located between the plurality of illuminators and the image sensor,
    wherein the plurality of illuminators sequentially illuminate the target object,
    wherein the image sensor acquires a captured image of the target object each time the plurality of illuminators illuminate the target object, and
    wherein the at least one control circuit
        (a) acquires information on the focal plane located between the plurality of illuminators and the image sensor,
        (b) carries out the following (c) through (f) for each of a plurality of pixels constituting the focal image,
        (c) carries out the following (d) through (f) for each of positions of the plurality of illuminators,
        (d) calculates a position of a target point, the target point being a point of intersection of a straight line connecting a position of the pixel on the focal plane and the position of the illuminator and a light receiving surface of the image sensor,
        (e) calculates a luminance value of the target point in the captured image acquired when the target object is illuminated from the position of the illuminator on the basis of the position of the target point on the light receiving surface of the image sensor,
        (f) applies the luminance value of the target point to a luminance value of the pixel,
        (g) generates the focal image of the target object on the focal plane by using a result of applying the luminance value at each of the plurality of pixels, and (h) outputs the generated focal image of the target object.

2. An image generating system, comprising:
a plurality of illuminators;
an image sensor on which a target object is to be placed; and
at least one control circuit,
wherein the image generating system generates a focal image of the target object on a virtual focal plane located between the plurality of illuminators and the image sensor,
wherein the plurality of illuminators sequentially illuminate the target object,
wherein the image sensor acquires a captured image of the target object each time the plurality of illuminators illuminate the target object, and
wherein the at least one control circuit
 (a) acquires information on the focal plane located between the plurality of illuminators and the image sensor,
 (b) carries out the following (c) through (f) for each of a plurality of the captured images,
 (c) acquires positional information of the illuminator that corresponds to the captured image,
 (d) carries out the following (e) and (f) for each of a plurality of first pixels included in the captured image,
 (e) calculates a position of a point of intersection of a straight line connecting a position of the first pixel on a light receiving surface of the image sensor and a position of the illuminator and the focal plane,
 (f) applies a luminance value of the first pixel to a luminance value of one or more second pixels, included in a plurality of second pixels constituting the focal image, that correspond to the position of the point of intersection on the focal plane,
 (g) generates the focal image of the target object on the focal plane by using a result of applying the luminance values of the plurality of second pixels, and
 (h) outputs the generated focal image of the target object.

3. The image generating system according to claim 1, wherein each of the plurality of illuminators includes
a light source, and
a shading plate located between the light source and the target object and having a pinhole,
wherein the light source irradiates the target object with diffused light through the pinhole.

4. The image generating system according to claim 1, further comprising:
a display,
wherein the display displays the focal image output from the at least one control circuit.

5. The image generating system according to claim 1,
wherein a range for an illumination position is determined on the basis of the information on the focal plane, and
wherein an illuminator, among the plurality of illuminators, that corresponds to the range for the illumination position sequentially illuminates the target object.

6. An image generating method of generating a focal image on a virtual focal plane located between a plurality of illuminators and an image sensor, the focal image being of a target object located on the image sensor, the image generating method comprising:
 (b1) acquiring a plurality of captured images of the target object captured while sequentially illuminating the target object by using the plurality of illuminators;
 (b2) acquiring information on the focal plane located between the plurality of illuminators and the image sensor;
 (b3) carrying out the following (b4) through (b7) for each of a plurality of pixels constituting the focal image;
 (b4) carrying out the following (b5) through (b7) for each of positions of the plurality of illuminators;
 (b5) calculating a position of a target point, the target position being a point of intersection of a straight line connecting a position of the pixel on the focal plane and the position of the illuminator and a light receiving surface of the image sensor;
 (b6) calculating a luminance value of the target point in a captured image acquired while the target object is illuminated from the position of the illuminator on the basis of the position of the target point on the light receiving surface of the image sensor;
 (b7) applying the luminance value of the target point to a luminance value of the pixel;
 (b8) generating the focal image of the target object on the focal plane by using a result of applying the luminance value at each of the plurality of pixels; and
 (b9) outputting the generated focal image of the target object,
wherein at least one of the above (b1) through (b9) is carried out by a control circuit.

7. An image generating method of generating a focal image on a virtual focal plane located between a plurality of illuminators and an image sensor, the focal image being of a target object located on the image sensor, the image generating method comprising:
 (b1) acquiring a plurality of captured images of the target object captured while sequentially illuminating the target object by using the plurality of illuminators;
 (b2) acquiring information on the focal plane located between the plurality of illuminators and the image sensor;
 (b3) carrying out the following (b4) through (b7) for each of the plurality of captured images;
 (b4) acquiring positional information of an illuminator that corresponds to the captured image;
 (b5) carrying out the following (b6) and (b7) for each of a plurality of first pixels included in the captured image;
 (b6) calculating a position of a point of intersection of a straight line connecting a position of the first pixel on a light receiving surface of the image sensor and a position of the illuminator and the focal plane;
 (b7) applying a luminance value of the first pixel to a luminance value of one or more second pixels, included in a plurality of second pixels constituting the focal image, that correspond to the position of the point of intersection on the focal plane;
 (b8) generating the focal image of the target object on the focal plane by using a result of applying the luminance values of the plurality of second pixels; and
 (b9) outputting the generated focal image of the target object,
wherein at least one of the above (b1) through (b9) is carried out by a control circuit.

8. The image generating method according to claim 6, further comprising:
 (a1) sequentially illuminating the target object located on the image sensor by the plurality of illuminators; and
 (a2) acquiring, with the image sensor, a captured image of the target object each time the plurality of illuminators illuminate the target object, wherein the plurality of captured images of the target object acquired by the image sensor are acquired in the (b1).

9. The image generating method according to claim 6, wherein the target object is a cell.

10. An image generating apparatus, comprising:

illuminators that each emit light toward a target object, the illuminators including a first illuminator and a second illuminator, periods of the light emissions from the illuminators being not overlapped;

an image sensor that includes pixels and obtains images of the target object during each of periods of the light emissions and outputs the images, the images including a first image and a second image, the first image being obtained during the light emission by the first illuminator and including first pixel values provided by the pixels, the second image being obtained during the light emission by the second illuminator and including second pixel values provided by the pixels, the target object being provided on the image sensor;

a generator that generates a third image on a virtual plane between the illuminators and the image sensor, the third image including third pixel values; and an output that outputs the third image, wherein the third pixel values include a third pixel value at a third location on the virtual plane, wherein the generator calculates the third pixel value using first pixel value and second pixel value, wherein the first pixel values includes the first pixel value, the second pixel values includes the second pixel value, the first pixel value is provided by a first pixel included in the pixels, and the second pixel value is provided by a second pixel included in the pixel, wherein the first pixel is a closest pixel, among the pixels, to a first point being an intersection of a first line including the third location and a location of the first illuminator, and a light receiving surface of the image sensor, wherein the second pixel is a closest pixel, among the pixels, to a second point being an intersection of a second line including the third location and a location of the second illuminator, and a light receiving surface of the image sensor, and wherein no focus lens is provided between the illuminators and the image sensor.

11. The image generating apparatus according to claim 10, wherein the light is parallel light.

* * * * *